United States Patent
Kato

(10) Patent No.: US 7,417,980 B2
(45) Date of Patent: Aug. 26, 2008

(54) INTERNET TELEPHONE SYSTEM

(75) Inventor: Tokunori Kato, Ichinomiya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 842 days.

(21) Appl. No.: 10/634,828

(22) Filed: Aug. 6, 2003

(65) Prior Publication Data

US 2004/0028207 A1 Feb. 12, 2004

(30) Foreign Application Priority Data

Aug. 6, 2002 (JP) ............................. 2002-228706
Aug. 12, 2002 (JP) ............................. 2002-234844

(51) Int. Cl.
*H04L 12/66* (2006.01)

(52) U.S. Cl. ...................... 370/352; 370/355

(58) Field of Classification Search .................. 370/352
See application file for complete search history.

(56) References Cited

U.S. PATENT DOCUMENTS

| 6,850,510 B2 * | 2/2005 | Kubler et al. ................ 370/338 |
| 7,061,901 B1 * | 6/2006 | Shnitzer et al. ............. 370/352 |
| 7,200,853 B2 * | 4/2007 | Kawai ........................... 725/34 |
| 2004/0109409 A1 * | 6/2004 | Simpson et al. ............. 370/229 |

FOREIGN PATENT DOCUMENTS

| JP | A 2-159860 | 6/1990 |
| JP | A 6-276568 | 9/1994 |
| JP | A 11-220549 | 8/1999 |
| JP | A 2000-261567 | 9/2000 |
| JP | A 2001-230879 | 8/2001 |

* cited by examiner

*Primary Examiner*—Creighton H Smith
(74) *Attorney, Agent, or Firm*—Oliff & Berridge, PLC

(57) ABSTRACT

An Internet telephone system is provided with an Internet terminal device capable of connecting with the Internet and transmitting and receiving audio signals for a voice communication. The Internet terminal has a communication unit through for transmitting/receiving the audio signals to/from the Internet. The Internet terminal device has a first interface for outputting/inputting the audio signals for the voice communication and a multifunction device having a telephone function and an Internet telephone function. The multifunction device has a sound input/output unit, a second interface that interfaces between the sound input/output unit and the first interface, a third interface that interfaces between the sound input/output unit and a public telephone network, and a switching system that switches the second interface and the third interface depending on whether the telephone function is used or the Internet telephone function is used.

11 Claims, 19 Drawing Sheets

INTERNET TELEPHONE SYSTEM

BACKGROUND OF THE INVENTION

The present invention relates to an IP (Internet Protocol) telephone system.

Conventionally, terminals capable of performing data communication through the Internet have been widespread. Among such terminals, there is known a device providing a voice communication through the Internet using a voice signal transmitting/receiving device, typically known as the IP telephone.

In such a device, the voice to be transmitted is input to the microphone and/or the voice received through the Internet is input to a speaker so that a user can use the device as a telephone system. However, depending on a position of the microphone and/or speaker or a location of a user with respect to the device, the voice output by the speaker and/or the voice input through the microphone may have insufficient volume. In such a case, audio messages may not be transmitted/received well. Therefore, when the IP telephone system is used, the terminal device is typically connected with a headset, which is a device having an integrally composed headphone or earphone, and a microphone.

The headset described above is, however, dedicated to the IP telephone system, and is not used for any other functions. Further, such a headset is typically connected with the terminal device with a wire, which restricts a positional relationship of the user with respect to the terminal device.

SUMMARY OF THE INVENTION

The present invention is advantageous in that an Internet telephone system which provides freedom in the positional relationship of the user with respect to the terminal device which is connected to the Internet. Further, the Internet telephone system does not require a dedicated headset.

According to an aspect of the invention, there is provided an Internet telephone system, which is provided with an Internet terminal that is capable of connecting with the Internet and transmitting and receiving audio signals for a voice communication. The Internet terminal has a communication unit through which the audio signals are transmitted to/received from the Internet. The Internet terminal is provided with a first interface through which the audio signals for the voice communication are output/input and a multifunction device including at least a telephone function and an Internet telephone function. The multifunction device has a sound input/output unit, a second interface that interfaces between the sound input/output unit and the first interface so that the Internet telephone function is realized, a third interface that interfaces between the sound input/output unit and a public telephone network so that the telephone function is realized, and a switching system that switches the second interface and the third interface depending on whether the telephone function is used or the Internet telephone function is used.

Optionally, the first interface and the second interface perform a wireless communication. Alternatively, the first interface and the second interface perform a wired communication.

Further, the multifunction device may be provided with a cordless handset which performs a wireless communication with the multifunction device.

According to another aspect of the invention, there is provided a telephone device having a telephone line terminal to connect with the telephone network and a voice input/output unit for a voice communication, an audio signal being transmitted/received, through the telephone line terminal and the telephone network, to/from another telephone terminal. The telephone device may be provided with a first audio signal input/output terminal connected with an Internet terminal device, the Internet terminal device being connected with another Internet terminal device through the Internet, the Internet terminal device transmitting/receiving audio signals for a voice communication with the another Internet terminal device through the Internet in accordance with an Internet telephone executing command signal that is externally input to the Internet terminal device, a first control signal input/output terminal that is connected with the Internet terminal device and transmitting/receiving control signals including the Internet telephone executing command signal, a first command input system that is operated by a user to input an Internet telephone starting command to the telephone terminal, an audio signal route switching system that switches a source/destination of the audio signal received/transmitted through the voice input/output device from the telephone line terminal to the first audio signal input/output terminal when the Internet telephone starting command is input through the first command input system, and an Internet terminal device controlling system that controls the first control signal input/output terminal to output the Internet telephone executing command to the Internet terminal device so that the audio signal is transmitted/received between the Internet terminal device and another Internet terminal device.

Optionally, the first command input system is configured to input terminal device information indicative of the another Internet terminal device with which the Internet terminal device communicates, and the Internet terminal device controlling system controls the first control signal input/output terminal to transmit the terminal device information to the Internet terminal device so that the Internet terminal device makes a call to the another Internet terminal device when the terminal information of the another Internet terminal device is input through the operable member.

The telephone device may further include a second command input system that is operated by the user to input a terminating command for terminating the Internet telephone, the Internet terminal device controlling system controls the first control signal input/output terminal to output an Internet telephone terminating command to the Internet terminal device so that the transmission/reception of the audio signals between the Internet terminal device and the another Internet terminal device when the terminating command is input through the second command input system.

The telephone device may further include a notifying system which notifies that a ringing signal that is a call to the telephone device is transmitted from the Internet terminal device.

The telephone device may further include a voice data storing device that stores voice data for guidance messages to be transmitted to a terminal device that makes a call to the telephone device, an audio guidance setting system that is operated by the user to set whether to reproduce an audio signal from the voice data stored in the voice data storing device and transmits the reproduced audio signal to the another terminal device that makes a call to the telephone device, and an audio guidance transmitting system that controls the first audio signal input/output terminal to transmits the voice data stored in the voice data storing device to the Internet terminal device so that the Internet terminal device transmits the audio signal to the another Internet terminal with which the telephone device communicates when it is set, with the audio guidance setting system, to transmit the audio signal to the another terminal device that makes a call to the telephone device.

The telephone device may further include a cordless terminal device which functions as the voice input/output device.

In this case, the telephone device may further include an interruption condition detection system that detects an interrupting condition that a wireless communication using the cordless terminal device is to be interrupted, and an interruption notifying system that transmits an audio signal for notifying that the wireless communication is interrupted to the another Internet terminal device that is switched to as the destination by the audio signal route switching system when the interruption condition detection system detects that the interrupting condition is satisfied.

Further optionally, the cordless terminal device may be configured to transmit a remaining capacity of a battery that supplies power to the cordless terminal device to the interruption condition detection system, and wherein the interruption condition detection system detects that the interruption condition is satisfied when the remaining capacity of the battery is equal to or less than a predetermined threshold value.

Optionally or alternatively, the interruption condition detection system may detect a radio field intensity of an electromagnetic wave the cordless terminal device receives for the wireless communication, the interruption condition detection system detecting that the interruption condition is satisfied when the radio field intensity of the electromagnetic wave is equal to or less than a predetermined threshold value.

According to a further aspect of the invention, there is provided an Internet terminal device connected with another Internet terminal device through the Internet, the Internet terminal device is provided with an audio signal input/output system that transmits/receives an audio signal for a voice communication with a telephone device, a control signal input/output terminal that is connected with the telephone device and transmits/receives control signals including the Internet telephone executing command signal from/to the telephone device, and an Internet terminal device controlling system that control the Internet terminal device such that the audio signal received from the telephone device is transmitted to another Internet terminal device through the Internet and the audio signal received through another Internet terminal device through the Internet is transmitted to the telephone device when the Internet telephone executing command is received from the telephone device through the control signal input/output terminal.

Optionally, when terminal data designating an Internet terminal device to be connected with is input to the control signal input/output terminal in addition to the Internet telephone executing command, the Internet terminal device controlling system controls the audio signal input/output system to call another Internet terminal device corresponding to the terminal data, the audio signal for the voice communication being transmitted to/received from the another Internet terminal device.

Further, when an Internet telephone terminating command is input to the control signal input/output terminal from the telephone device during operation of the audio signal input/output system, the Internet terminal device controlling system terminates the input/output of the audio signal of the audio signal input/output system with the another Internet terminal device.

Still optionally, when a ringing tone signal for the Internet telephone communication is transmitted from another Internet terminal device through the Internet, the Internet terminal device controlling system transmits the ringing tone signal to the telephone device through the control signal input/output terminal.

According to a further aspect of the invention, an Internet telephone system is provided, which include any appropriate combination of a telephone device and an Internet terminal device indicated above.

According to another aspect of the invention, there is provided a method of controlling a telephone device in accordance with an Internet telephone starting command, the telephone device having a telephone line terminal to connect with the telephone network, a voice input/output unit for a voice communication, a first audio signal input/output terminal through which an audio signal for the voice communication is input to/output from an Internet terminal device, a first control signal input/output terminal through which control signals are input to/output from the Internet terminal device. The method includes the steps of switching a destination of the audio signal input through the voice input/output unit and a source of the audio signal output through the voice input/output unit from the telephone line terminal to the first audio signal input/output terminal in accordance with the input of the Internet telephone starting command, and controlling the Internet terminal device to transmit/receive the audio signal to/from another Internet terminal device by controlling the telephone device to transmits the Internet telephone starting command to the Internet terminal device through the first control signal input/output terminal upon receipt of the Internet telephone starting command.

According to a further aspect of the invention, there is provided a method of controlling the Internet terminal device, the Internet terminal device being connected with another Internet terminal device through the Internet, the Internet terminal device including an audio signal input/output system that transmits/receives an audio signal for a voice communication with a telephone device, a control signal input/output terminal that is connected with the telephone device and transmits/receives control signals including the Internet telephone executing command signal from/to the telephone device. The method includes a step of controlling the Internet terminal device such that the audio signal received from the telephone device is transmitted to another Internet terminal device through the Internet and the audio signal received through another Internet terminal device through the Internet is transmitted to the telephone device when the Internet telephone executing command is received from the telephone device through the control signal input/output terminal.

According to a furthermore aspect of the invention, there is provided an Internet telephone system having a telephone device and an Internet terminal device.

The telephone device includes a telephone line terminal to connect with the telephone network and a voice input/output unit for a voice communication, an audio signal being transmitted/received, through the telephone line terminal and the telephone network, to/from another telephone device, a first wireless communication interface that transmits/receives signals with a wireless communication, the signals transmitted/received through the wireless communication including an audio signal for a voice communication and control signals including an Internet telephone executing command signal, the Internet telephone executing command being transmitted to the telephone device when the Internet telephone communication is started, an audio signal route switching system that switches a source/destination of the audio signal received/transmitted through the voice input/output device from the telephone line terminal to the first wireless communication interface when the Internet telephone communication is performed.

The Internet terminal device includes a second wireless communication interface that transmits/receives signals to/from the first wireless communication interface, and an Internet terminal device controlling system that controls the Internet terminal device such that the audio signal received from the telephone device through the first and second wireless communication interfaces is transmitted to an another Internet terminal device through the Internet and the audio signal received through the another Internet terminal device through the Internet is transmitted to the telephone device through the first and second wireless communication interfaces when the Internet telephone executing command is received from the telephone device through the first and second wireless communication interfaces.

According to a further aspect of the invention, there is provided a telephone terminal that realizes a voice communication by inputting/outputting voice using a voice input/output device in accordance with an audio signal transmitted through a telephone line network. The telephone terminal is provided with an audio signal input/output path through which the audio signal is exchangeable with an external device, and a route switching system that switches, in accordance with an operation of a user, a source of the audio signal input to the voice input/output device and a destination of the audio signal output from the voice input/output device to the audio signal input/output path.

According to a furthermore aspect of the invention, there is provided with an Internet telephone system configured such that an Internet terminal having a Internet telephone function, comprising a telephone terminal connected to the Internet terminal, the telephone terminal capable of realizing a voice communication by inputting/outputting voice using a voice input/output device in accordance with an audio signal transmitted through a telephone line network. The telephone terminal further includes an audio signal input/output path through which the audio signal is exchangeable with an external device, and a route switching system that switches, in accordance with an operation of a user, a source of the audio signal input to the voice input/output device and a destination of the audio signal output from the voice input/output device to the audio signal input/output path.

The devices and methods according to the present invention can be realized when appropriate programs provided and executed by a personal computer. Such programs may be stored in recording medium such as a flexible disk, CD-ROM, memory cards and the like and distributed. Alternatively or optionally, such programs can be distributed through networks such as the Internet.

BRIEF DESCRIPTION OF THE ACCOMPANYING DRAWINGS

DETAILED DESCRIPTION OF THE EMBODIMENTS

Hereinafter, Internet telephone systems according to embodiments of the invention will be described with reference to the accompanying drawings.

First Embodiment

Figure 1:
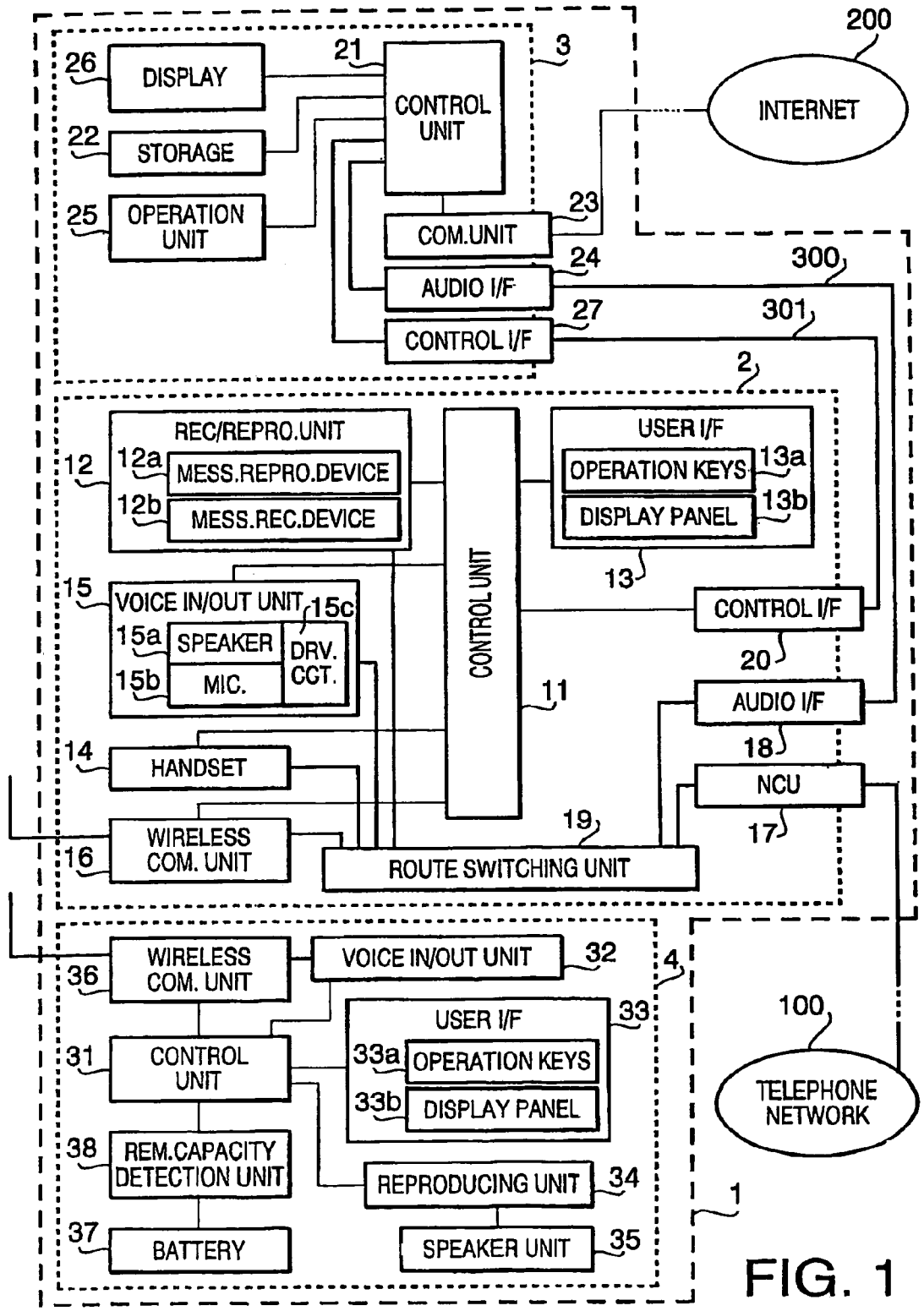
FIG. 1 is a block diagram showing a configuration of an Internet telephone system according to the invention.

FIG. 1 is a block diagram showing a configuration of an Internet telephone system 1 according to an embodiment of the invention. The Internet telephone system 1 includes, as shown in FIG. 1, a multifunction device (MFD) 2 having at least a function as a telephone set using the public telephone network, and a function as a PC (personal computer) 3 capable of performing a data communication through the Internet 200, which are connected with each other through an audio cable 300 for transmitting an audio signal and a control signal cable 301 for transmitting a control signal.

As an example of such a control signal cable 301, an USB (Universal Serial Bus) cable is known. Alternatively, a serial cable, a Centronics bus cable, or any other similar cable capable of transmitting the control signal can be used.

According to the exemplary embodiment, the MFD 2 includes:

- a control unit 11 that controls entire operation of the MFD 2;
- a recording/reproducing unit 12 that records/reproduces voice (sound) based on various audio signals;
- a user interface unit (hereinafter, referred to as a user I/F unit) 13;
- a handset 14 which is provided with an earphone and a receiver, and is picked up from a main body of the MFD 2 when it is used;
- an audio input/output unit 15 including a speaker 15a and a microphone 15b;
- a wireless communication unit 16 for executing wireless transmission/reception of signals;
- an NCU (network control unit) 17 through which an audio signal is transmitted to/received from another telephone system through the public telephone network 100;
- an audio interface (hereinafter, referred to as audio I/F) 18 that interfaces the audio signal transmitted/received through the audio cable 300;
- a route switching unit 19 that switches a route of the audio signal inside the MFD 2;
- a control signal interface (hereinafter, referred to as a control I/F) 20 that interfaces the control signal transmitted/received through the control signal cable 301; and
- a cordless handset 4 that performs a wireless communication with the wireless communication unit 16.

The recording/reproducing unit 12 includes a message reproducing device 12a that reproduces voice messages, which are stored in advance as audio signals, and a message recording device 12b that stores messages, which are received using an answering machine function, as the audio signals. The message reproducing device 12a stores audio signals representing a ringing tone, a holding tone, an answering message stating to start recording a caller's message, and a disconnection notifying message, which is used in a disconnection notifying procedure (described later).

The user I/F 13 includes a plurality of operation keys 13a operable by the user, and a display panel 13b for displaying various information for the user.

The audio input/output unit 15 includes the speaker 15a, the microphone 15b, and a driving circuit 15c that drives the speaker 15a and the microphone 15b. The speaker 15a is used for outputting various tones such as the ringing tone. Further, the speaker 15a and the microphone 15b are used as telephone receiver/microphone for handsfree use.

The wireless communication unit 16 is used for transmits/receives various signals including the audio signal to/from the cordless handset 4. The wireless communication unit 16 is configured to examine a radio field intensity of a radio wave transmitted from the cordless handset 4 when the wireless communication is performed with respect to the cordless handset 4.

The route switching unit 19 switches a transmission path of the audio signal transmitted to/received from an external device between the NCU 17 and the audio I/F 18. At an initial stage, the transmission path is set to use the audio signal transmitted/received through the NCU 17.

Further, when an off-hook operation (i.e., an operation for starting to call) is performed with one of the operation units which function as the transmitting/receiving devices, the route switching unit 19 switches the transmission path of the audio signal to one corresponding to a source from which the audio signal is input and a destination to which the audio signal is to be transmitted.

That is, when the handset 14 is picked up from the main body of the MFD 2, the transmission path is switched to the path corresponding to the handset 14 (i.e., the path allowing the audio signals transmitted to/received from the handset 14 to pass through). When an operation for starting the handsfree communication using the keys 13a of the user I/F 13 is operated, the transmission path is switched to one corresponding to the audio input/output unit 15. If the operation for staring the communication using the cordless handset 4 is performed (e.g., operation keys 3a are operated, which will be described later), the transmission path is switched to one corresponding to the wireless communication unit 16.

Further, if the off-hook operation has not been performed for a predetermined period since a call through the public telephone network 100 was received, or if the MFD 2 functions as the answering machine as the operation keys 13a of the user I/F were operated, the route switching unit 19 switches the destination and source of the audio signal as the recording/reproducing unit 12.

After the destination and the source are switched to the recording/reproducing unit 12, it reproduces, under control of the control unit 11, an answering machine message stored in the message reproducing device 12a. The audio signal carrying the answering machine message is transmitted to a caller station through the public telephone network 100. Thereafter, the audio signal transmitted from the caller station to the MFD 2 through the public telephone network 100 is recorded in the message recording device 12b.

The cordless handset 4 includes:

- a control unit 31 that controls the entire operation of the cordless handset 4;
- a transmission/reception unit 32 including a speaker and a microphone;
- a user I/F 33 having a plurality of operation keys 33a including a plurality of numeral keys and a display panel 33b;
- a reproducing unit 34 that reproduces voice/sound based on audio signals preliminarily stored therein;
- a speaker unit 35 that includes a speaker that outputs the voice/sound reproduced by the reproducing unit 34 and a driving circuit for driving the speaker;
- a wireless communication unit 36 that performs wireless transmission/reception of various signals including the audio signal between the wireless communication unit 16 of the MFD 2;
- a battery 37 supplying electrical power of the cordless handset 4; and
- a remaining capacity detecting unit 38 that detects a remaining capacity of the battery 37.

The reproducing unit 34 of the cordless handset 4 stores the audio signals of the ringing tone which is used when a call is received, and the holding tone which is used when a telephone call is held.

The cordless handset 4 is configured such that, when the wireless communication is performed, a notification signal for notifying the remaining capacity of the battery 37, which is detected by the capacity detecting unit 38, is transmitted to the MFD 2 at every predetermined period (e.g., 5 seconds, in this embodiment). The notification signal is used in a disconnection notifying procedure, which will be described later.

The PC 3 includes:
- a control unit 21 that controls the entire operation of the PC 3;
- a storage unit 22 that stores various information;
- a communication unit 23 that connects the PC 3 to the Internet 200;
- an audio signal interface (hereinafter, referred to as an audio I/F) 24;
- an operation unit 25 having a keyboard and a mouse;
- a display unit 26; and
- a control signal interface (hereinafter, referred to as a control signal I/F) 27 that interfaces the control signal transmitted through the control signal cable 301.

The PC 3 has an Internet telephone function. The Internet telephone function is achieved with an Internet telephone starting procedure, an Internet telephone transmitting/receiving procedure, an Internet telephone terminating procedure, which are executed as the PC 3 executes application software embedded in the storage unit 22.

In the internet telephone starting procedure, a connection is established (i.e., logical transmission paths are connected) between the PC 3, which is an Internet terminal, and another Internet terminal, which is implemented with the same Internet telephone software and is communicable with the PC 3 through the Internet 200, so that the data communication between the PC 3 and the other Internet terminal can be initiated. The Internet telephone starting procedure is executed when the user operates the operation keys 33a of the user I/F 33 to designate a destination Internet terminal (i.e., a called terminal) with the Internet telephone software running on the PC 3.

In the Internet telephone transmitting/receiving procedure, pieces of data are generated based on the audio signal, on a packet basis, and the thus generated data is transmitted to the Internet terminal with which the connection is established through the communication unit 23 and the Internet 200. Further, in this procedure, the audio signal is reproduced based on the packet data transmitted, through the Internet 200 and the communication unit 23, from the Internet terminal with which the connection is established. Specifically, according to the embodiment, the packet data is generated based on the audio signal input from the MFD 2 through the audio cable 300 and the audio I/F 24, and the audio signal generated in accordance with the packet data is transmitted to the MFD 2 through the audio I/F 24 and the audio cable 300.

The Internet telephone transmitting/receiving procedure is repeatedly executed after the Internet telephone starting procedure is executed till the Internet telephone terminating procedure is executed. With this Internet telephone transmitting/receiving procedure, the voice communication is available between the PC 3 (i.e., the MFD 2 connected to the PC 3) and the designated Internet terminal through the Internet 200.

In the Internet telephone terminating procedure, by releasing the established connection between the PC 3 and the designated Internet terminal (i.e., by logically disconnecting the transmission paths), the voice communication making use of the Internet telephone function is terminated. This procedure is executed when the user operates the operation keys 33a of the user I/F to terminate the Internet telephone. According to the embodiment, the Internet telephone software is designed such that the above operation for termination is performed, a release signal notifying the release of the connection (i.e., disconnection) is transmitted from the Internet terminal implemented with the Internet telephone software, and the PC 3 executes the Internet telephone terminating procedure when the release signal is received from the designated Internet terminal with which the connection was established.

It should be noted that, as a part of the transmission path from communication unit 23 of the PC 3 to the Internet 200 (e.g., a zone from the user to a telephone exchange station), the telephone line from the NCU 17 of the MFD 2 to the public telephone network 100 is used. Within this zone, the audio signal to be transmitted through the public telephone network and the data to be transmitted through the Internet 200 are transmitted as an overlapped state in accordance with an ADSL (Asymmetric Digital Subscriber Line) architecture.

Calling Sequence

Figure 2:
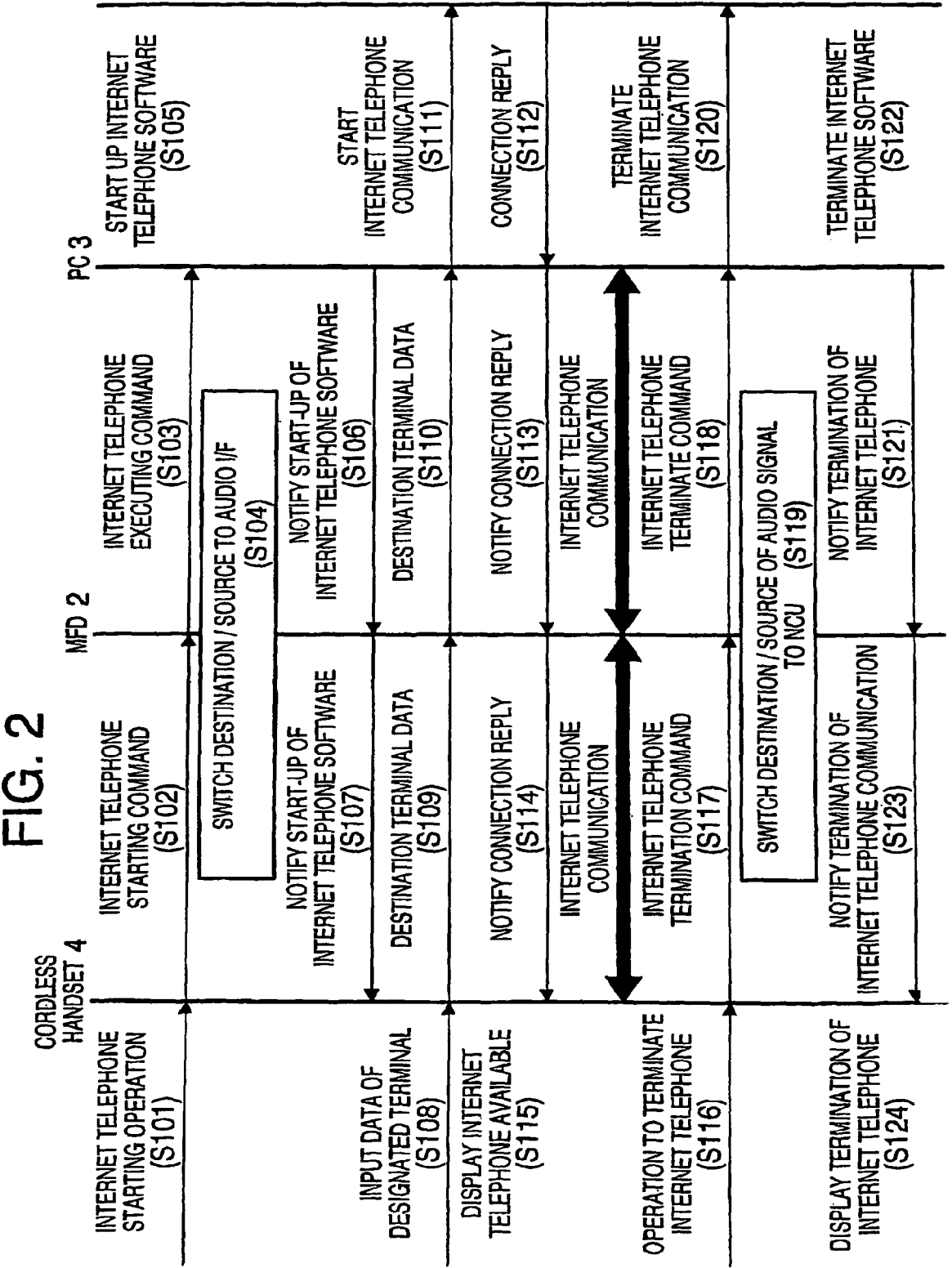
FIG. 2 shows a calling sequence of the Internet telephone system shown in FIG. 1.

FIG. 2 shows a calling sequence of the Internet telephone system 1 shown in FIG. 1.

When the user of the Internet telephone system 1 operates a start key of the operation keys 33a of the cordless handset 4 to start the Internet telephone (S101), the cordless handset 3 transmits an Internet telephone starting command to the MFD 2 (S102). When the MFD 2 receives the Internet telephone starting command, it transmits an Internet telephone executing command to the PC 3 (S103), and switches the destination and source of the audio signal to the audio I/F 18 (S104). When the PC 3 receives the Internet telephone executing command, it starts up the Internet telephone software (S105).

When the Internet telephone software is executed, the PC 3 transmits an Internet telephone software execution notification to the MFD 2 (S106). When the MFD 2 receives the Internet telephone software execution notification, it transmits the Internet telephone software execution notification to the cordless handset 4 (S107). When the Internet telephone software execution notification is received, the cordless handset notifies the user of the Internet telephone system 1 that the telephone number of a destination or information such as an IP address of a destination terminal can be input, by displaying a message on the display panel 33b.

Then, the user inputs the information of the destination terminal through the operation keys 33a (S108). The input information is transmitted from the cordless handset 4 to the MFD 2 (S109). When the information of the destination terminal is received, the MFD 2 transmits the information of the destination terminal to the PC 3 (S110). Then the PC 3 establish a connection (i.e., connects the logical transmission path) with the destination terminal to start data communication with the destination Internet terminal (S111).

When the PC 3 receives a connection response from the destination Internet terminal (S112), the PC 3 transmits a connection response notification to the MFD 2 (S113). When the MFD 2 receives the connection response notification, it transmits the connection response notification to the cordless handset 4 (S114). When the connection response notification is received, the cordless handset 4 notifies the user of the Internet telephone system 1 that the Internet telephone communication can be done, for example, by displaying a message on the display panel 33b (S115).

Thereafter, the Internet telephone communication through the cordless handset 4 can be performed. That is, the voice/sound input through the transmission/reception unit 32 of the cordless handset 4 is transmitted to the MFD 2 through the wireless communication unit 36, and then transmitted to the PC 3 through the audio I/F 18 of the MFD 2. The voice/sound input to the MFD 2 through the audio I/F is transmitted to the transmission/reception unit 32 of the cordless handset 4 through the wireless communication unit 16.

When the user of the Internet telephone system 1 operates the operation keys 33a of the cordless handset 4 to terminate the Internet telephone (S116), then the cordless handset 4 transmits an Internet telephone terminating command to the MFD 2 (S117). When the Internet telephone terminating command is received, the MFD 2 transmits the Internet telephone terminating command to the PC 3 (S118), and switches the destination/source of the audio signal to the NCU 17 (S119), which is the default setting.

When the Internet telephone terminating command is received, the PC 3 terminates the Internet telephone communication (S120), transmits the Internet telephone termination notification to the MFD 2 (S121), and terminates the Internet telephone software (S122).

When the MFD 2 receives the Internet telephone terminating notification, it transmits the Internet telephone termination notification to the cordless handset 4 (S123). When the Internet telephone termination notification is received, the cordless handset 4 displays, on the display panel 33*b*, that the Internet telephone communication is terminated (S124).

In a calling procedure of the Internet telephone system 1 described above, switching of the destination/source of the audio signal (S104) to the audio I/F 18 is executed after the Internet telephone starting command is received (S102). Alternatively, the switching may be executed after the Internet telephone software execution notification (S106), after the reception of the destination information (S109) or after the reception of the connection reply notification (S113). In other words, the switching may be executed between the operation for starting the Internet telephone (S101) and the notification of the availability of the Internet telephone communication (S115).

Similarly, the switching of the destination/source of the audio signal to the NCU 17 (S119) is executed after reception of the Internet telephone termination notification (S117). Alternatively, the switching of the source/destination of the audio signal may be done after the reception of the Internet telephone termination notification (S121). In other words, the switching of the destination/source of the audio signal to the NCU 17 is performed from the operation for terminating the Internet telephone in S116 to the display of the termination in S124.

Call Receiving Sequence

Figure 3:
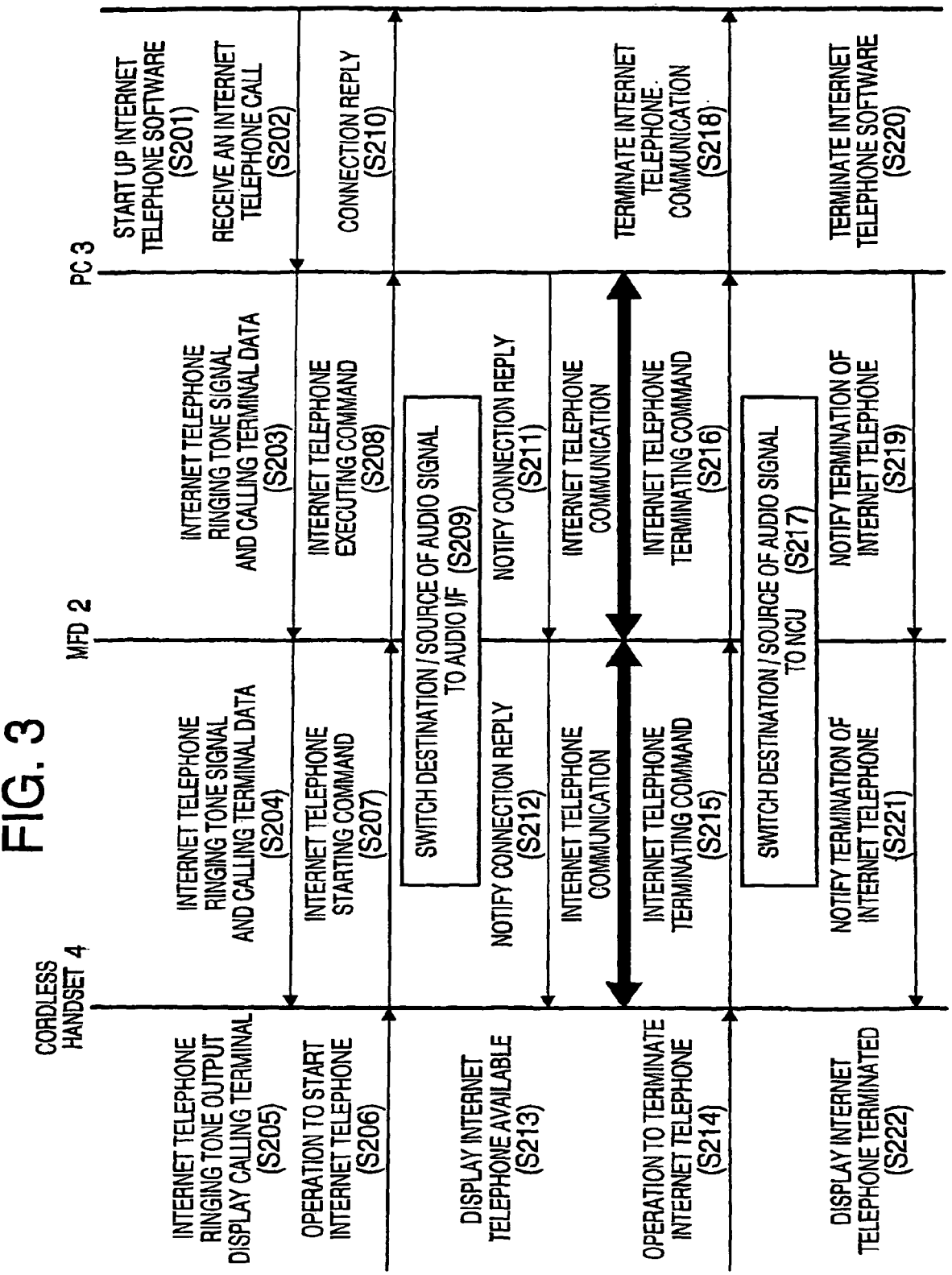
FIG. 3 shows a call receiving sequence of the Internet telephone system shown in FIG. 1.

FIG. 3 shows a call receiving sequence of the Internet telephone system 1 shown in FIG. 1.

In S201, the Internet telephone software is executed when the user of the Internet telephone system 1 operates the operation unit 25 of the PC. 3. The PC 3 is capable of receiving a request for the Internet telephone from another Internet terminal. When the PC 3 receives the request for the Internet telephone (S202), it transmits an Internet telephone calling signal and data of a calling station to the MFD 2 (S203).

When the MFD 2 receives the Internet telephone calling signal and the data of the calling station, the MFD 2 transmits the Internet telephone calling signal and the data of the calling station to the cordless handset 4 (S204). When the Internet telephone calling signal and the data of the calling station is received, the cordless handset 4 notifies the user that there is a call with an Internet telephone ringing tone, and displays the data of the calling station on the display panel 33*b* (S205).

When the user who is notified that there is a call, the user operates the operation keys 33*a* of the cordless handset 4 to start the Internet telephone communication (S206). Further, the cordless handset 4 transmits the Internet telephone starting command to the MFD 2 (S207). When the Internet telephone starting command is received, the MFD 2 transmits the Internet telephone execution command to the PC 3 (S208) and switches the destination/source of the audio signal to the audio I/F 18 (S209).

When the Internet telephone execution command is received, the PC 3 establishes a connection with the calling station (Internet terminal), i.e., logically connecting the transmission paths to start data communication with the calling station, and transmits a connection response to the calling station (S210). Further, the cordless handset 4 transmits a connection response notification to the MFD 2 (S211).

When received the connection response notification, the MFD 2 transmits the connection response notification to the cordless handset 4 (S212). When the connection response notification, the cordless handset 4 notifies the user of the Internet telephone system 1 that the Internet telephone communication is available by, for example, displaying a message on the display panel 33*b* (S213). With this operation, the voice/sound input through the transmission/reception unit 32 of the cordless handset 4 is transmitted to the MFD 2 through the wireless communication unit 36, transmitted to the PC 3 through the audio I/F 18 of the MFD 2. The voice/sound transmitted from the PC 3 to the MFD 2 through the audio I/F 18 is transmitted to the transmission/reception unit 32 of the cordless handset 4. Therefore, the Internet telephone communication can be done using the cordless handset 4.

Thereafter, when the user operates the operation keys 33*a* of the cordless handset 4 (S214). Then, the cordless handset 4 transmits the Internet telephone terminating command to the MFD 2 (S215). When the Internet telephone terminating command is received, the MFD 2 transmits the Internet telephone terminating command to the PC 3 (S216) and switches the destination/source of the audio signal to the NCU 17 (S217), which is the default destination/source.

When the Internet telephone terminating command is received, the PC 3 terminates the Internet telephone communication (S218), transmits the Internet telephone termination notification to the MFD 2 (S219), and terminates the Internet telephone software (S220). When the Internet telephone termination notification is received, the MFD 2 transmits the Internet telephone termination notification to the cordless handset 4 (S221). When the Internet telephone termination notification is received, the cordless handset 4 notifies the user the termination of the Internet telephone communication by displaying a message on the display panel 33*b* (S222)

In the call receiving procedure of the Internet telephone system 1 described above, the switching of the destination/source of the audio signal to the audio I/F 18 (S209) is executed after the reception of the Internet telephone starting command (S207). This may be modified to be executed after the reception of the connection response notification (S211). In other words, the switching of the destination/source of the audio signal to the audio I/F may be executed between the operation to start the Internet telephone communication (S206) and the display of the availability of the Internet telephone communication (S213).

Switching of the destination/source of the audio signal to the NCU 17 (S217) is executed after the reception of the Internet telephone terminating command (S215). This may; be executed after the reception of the Internet telephone termination notification (S219). In other words, the switching of the destination/source of the audio signal to the NCU 17 may be executed between the operation to terminate the Internet telephone communication (S214) and the display of the termination of the Internet telephone communication (S222).

Internet Telephone Connecting Procedure (MFD)

Figure 4:
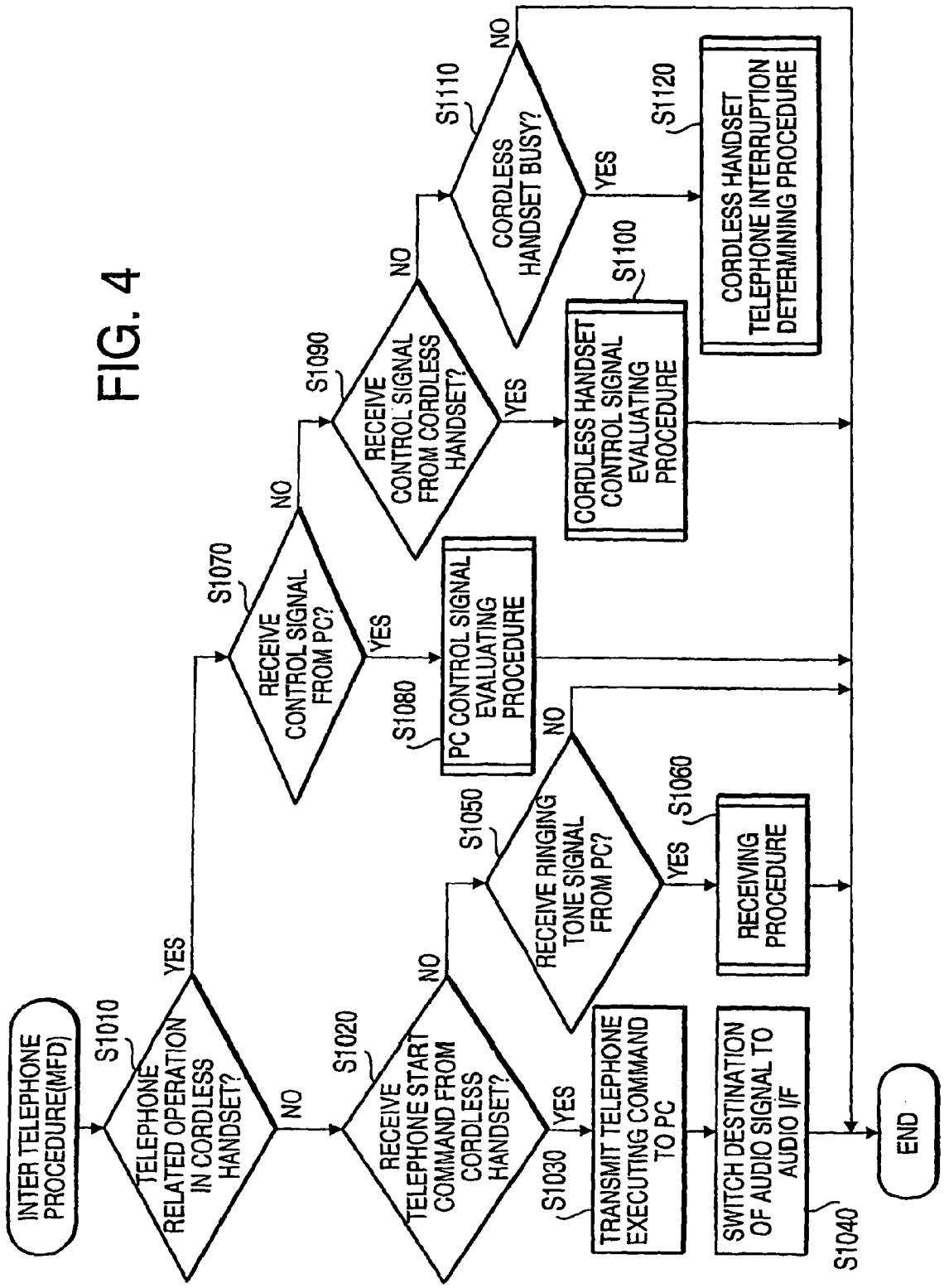
FIG. 4 shows a flowchart illustrating an Internet telephone connecting procedure executed by a control unit of an MFD (Multi Function Device) of the Internet telephone system shown in FIG. 1.

FIG. 4 shows a flowchart illustrating an Internet telephone connecting procedure executed by the control unit 11 of the MFD 2 of the Internet telephone system 1 shown in FIG. 1. This procedure is repeatedly executed when the MFD 2 operates (i.e., is powered ON).

In the Internet telephone connecting procedure, the control unit 11 determines whether an operation related to a communication (e.g., the Internet telephone communication) is currently executed in the cordless handset 4 in S1010. When the cordless handset 4 does not execute such an operation (S1010: NO), control proceeds to S1020, where the control unit 11 determines whether the Internet telephone starting command is received from the cordless handset 4. When the control unit 11 determines that the Internet telephone starting command is received from the cordless handset 4 (S1020: YES), it transmits the Internet telephone executing command to the PC 3 (S1030), and then, switches the destination/source of the audio signal to the audio I/F 18 (S1040) and terminates the Internet telephone connecting procedure.

When the control unit 11 determines that it has not received the Internet telephone starting command from the cordless handset 4 (S1020: NO), control proceeds to S1050, where the control unit 11 determines whether the Internet telephone calling signal is received. When the control unit 11 determines that the Internet telephone calling signal is received (S1050: YES), it executes the call receiving procedure (S1060). When the call receiving procedure is terminated, the control unit 11 terminates the Internet telephone connecting procedure.

Figure 5:
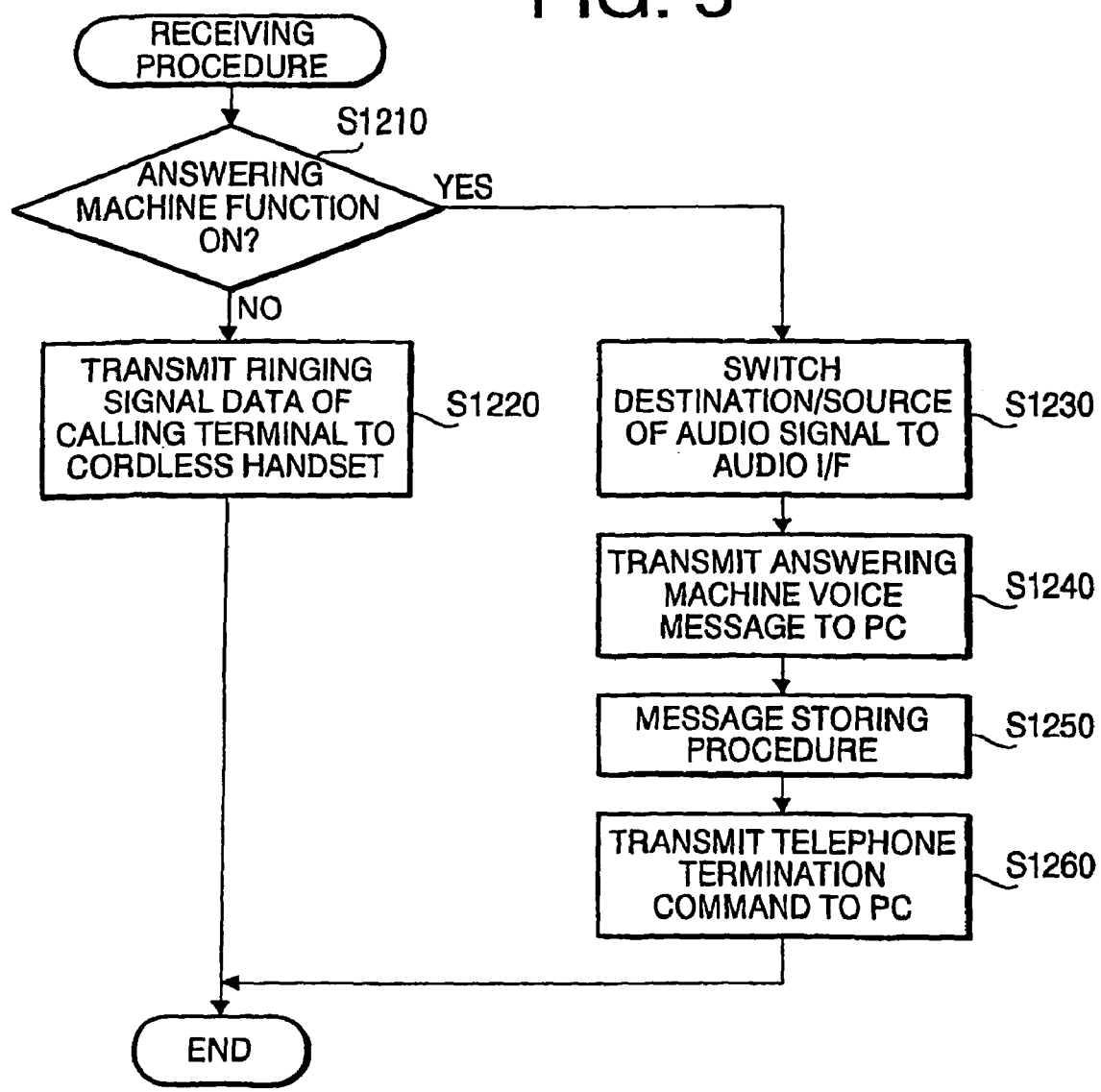
FIG. 5 shows a flowchart illustrating a call receiving procedure executed by a control unit of the MFD of the Internet telephone system shown in FIG. 1.

FIG. 5 shows a flowchart illustrating the call receiving procedure executed by the control unit 11. In the procedure, the control unit 11 determines whether the answering machine function is set to ON in S1210. When the control unit 11 determines that the answering machine function is not ON (S1210: NO), control proceeds to S1220, where the control unit 11 transmits the Internet telephone calling signal and the data of the calling station to the cordless handset 4, and terminates the call receiving procedure.

The Internet telephone system 1 is configured such that the answering machine function is set to ON when the user depresses an answering machine function key (not shown) included in the operation keys 33a or 13a. Once the answering machine function is set to ON, unless the function is released by the same operation by the user, the function is held.

When the control unit 11 determines that the answering machine function is set to ON (S1210: YES), control proceeds to S1230, where the control unit 11 switches the destination/source of the audio signal to the audio I/F 18 (S1230). Then, the control unit 11 transmits a recordation guidance message saying that the answering machine function starts recording a message from the message reproducing device 12a to the PC 3 through the audio I/F 18 (S1240). After the recordation guidance message has been transmitted, the control unit 11 starts the message recording procedure (S1250) for storing the audio signal transmitted from the calling station through the audio I/F 18 in the message recording device 12b. After the message recording procedure is finished, the control unit 11 transmits the Internet telephone terminating command to the PC 3 (S1260), and terminates the call receiving procedure.

Back to FIG. 4, in S1010, when the control unit 11 determines that the operation related to the telephone communication is currently executed (S1010: YES), the control unit 11 determines whether a control signal is received from the PC 3 (S1070). When the control unit 11 determines that the control signal is received form the PC 3 (S1070: YES), control proceeds to S1080, where a PC control signal evaluating procedure is executed. When the PC control signal evaluating procedure is finished, the control unit 11 terminates the Internet telephone connecting procedure.

Figure 6:
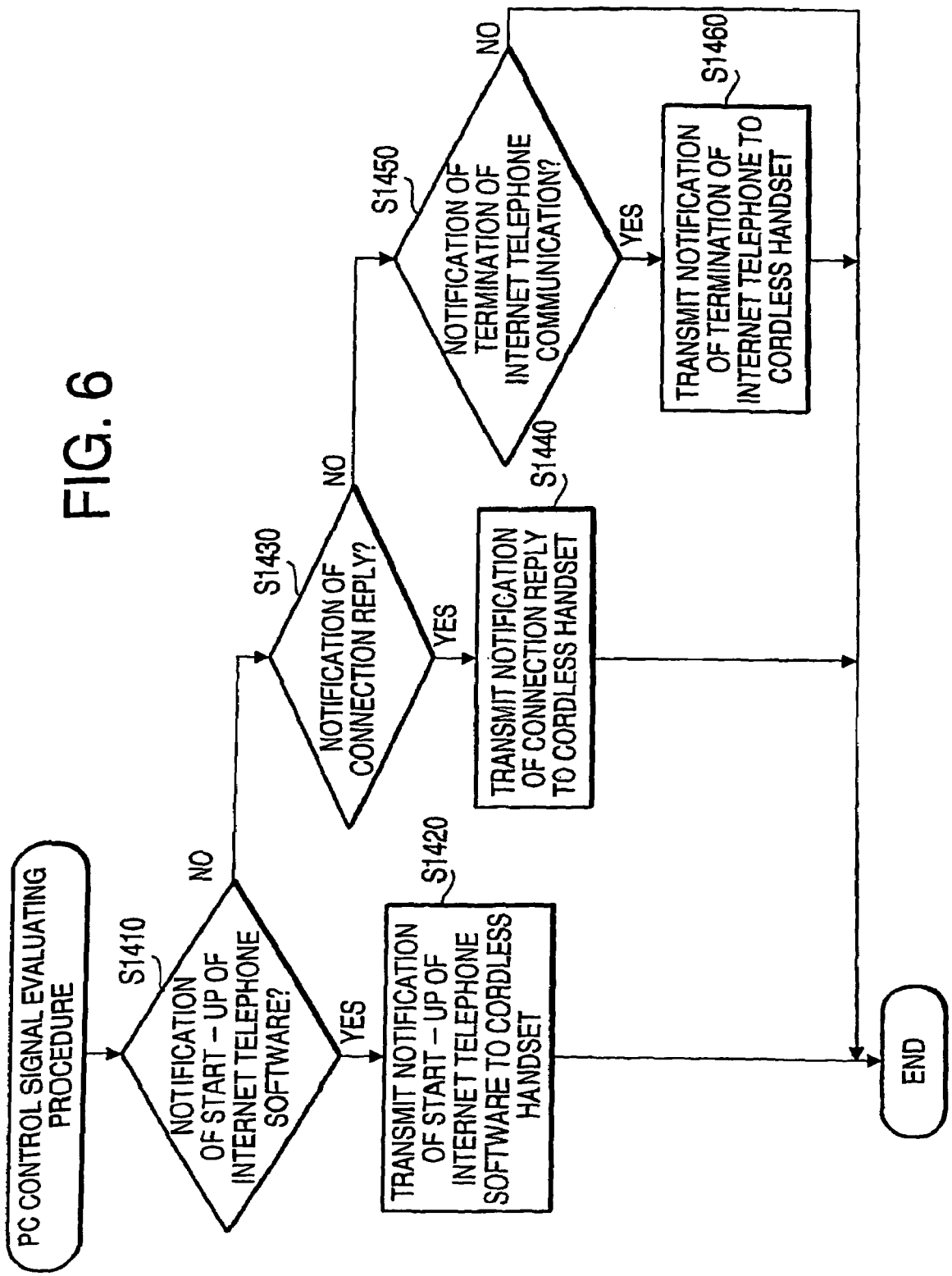
FIG. 6 shows a flowchart illustrating a PC control signal evaluating procedure executed by the control unit of the MFD of the Internet telephone system shown in FIG. 1.

FIG. 6 shows a flowchart illustrating the PC control signal evaluating procedure executed by the control unit 11. In the PC control signal evaluating procedure, the control unit 11 determines whether the control signal represents a notification of the start-up of the Internet telephone software. When the control unit 11 determines that the control signal is not the notification of the start-up of the Internet telephone software (S1410: NO), control proceeds to S1430, where the control unit 11 determines whether the control signal represents the connection response notification. When the control unit 11 determines that the control signal represents the connection response notification (S1430: YES), control proceeds to S1440, where the control unit 11 transmits the connection response notification to the cordless handset 4, and terminates the PC control signal evaluating procedure.

When the control unit 11 determines that the control signal does not represent the connection response notification (S1430: NO), control proceeds to S1450, where the control unit 11 determines whether the control signal represents the Internet telephone termination notification. When the control unit 11 determines that the control signal represents the Internet telephone termination notification (S1450: YES), control proceeds to S1460, where the control unit 11 transmits the Internet telephone termination notification to the cordless handset 4, and terminates the PC control signal evaluating procedure.

When the control unit 11 determines that the control signal does not represent the Internet telephone termination notification (S1450: NO), the control unit 11 terminates the PC control signal evaluating procedure.

Back to FIG. 4, when the control unit 11 determines that the control signal is not received from the PC 3 (S1070: NO), control proceeds to S1090, where the control unit 11 determines whether the control signal is received from the cordless handset 4. When the control unit 11 determines that the control signal is received from the cordless handset (S1090: YES), control proceeds to S1100 where a cordless handset control signal evaluating procedure is executed. When the cordless handset control signal evaluating procedure is finished, the control unit 11 terminates the Internet telephone connecting procedure.

Figure 7:
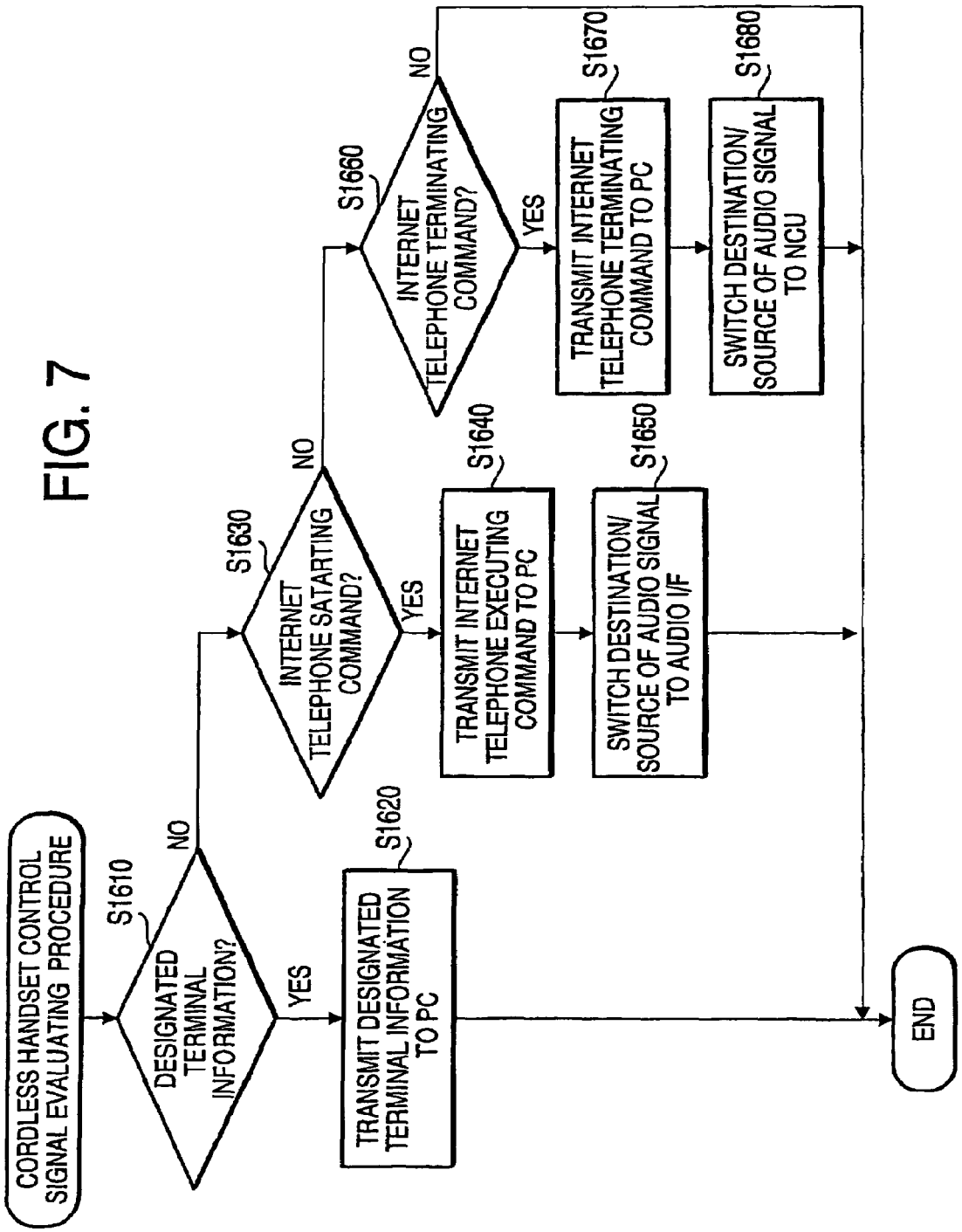
FIG. 7 shows a flowchart illustrating a cordless handset control signal evaluating procedure executed by the control unit of the MFD of the Internet telephone system shown in FIG. 1.

FIG. 7 shows a flowchart illustrating the cordless handset control signal evaluating procedure executed by the control unit 11 of the MFD 2 of the Internet telephone system 1 shown in FIG. 1. In S1610, the control unit 11 determines whether the control signal represents terminal information of the calling station. When the control unit 11 determines that the control signal represents the terminal information of the calling station (S1610: YES), control proceeds to S1620, wherein the control unit 11 transmits the terminal information of the calling station to the PC 3, and terminates the cordless handset control signal evaluating procedure.

When the control unit 11 determines that the control signal does not represent the terminal information of the calling station (S1610: NO), control proceeds to S1630, in which the control unit 11 determines whether the control signal represent the Internet telephone starting command. When the control unit 11 determines that the control signal represents the Internet telephone starting command (S1630: YES), control proceeds to S1640, where the control unit 11 transmits the Internet telephone executing command to the PC 3. When the procedure in S1640 is finished, control proceeds to S1650, where the control unit 11 switches the destination/source of the audio signal to the audio I/F 18, and terminates the cordless handset control signal evaluating procedure.

When the control unit 11 determines that the control signal does not represent the Internet telephone starting command (S1630: NO), control proceeds to S1660, where the control unit 11 determines whether the control signal represents the Internet telephone terminating command. When the control unit 11 determines that the control signal represents the Internet telephone terminating command (S1660: YES), control proceeds to S1670, where the control unit 11 transmits the Internet telephone terminating command to the PC 3. Then, control proceeds to S1680, where the control unit 11 switches the destination/source of the audio signal to the NCU 17, and terminates the cordless handset control signal evaluating procedure.

When the control unit 11 determines that the control signal does not represent the Internet telephone terminating command (S1660: NO), the control unit 11 terminates the cordless handset control signal evaluating procedure.

Back to FIG. 4, when the control unit 11 determines that the control signal is not received (S1090: NO), control proceeds to S1110, where the control unit 11 determines whether the cordless handset 4 is busy (i.e., the telephone communication is currently performed). When the control unit 11 determines that the cordless handset 4 is busy (S1110: YES), control proceeds to S1120, where the control unit 11 executes the cordless handset interruption determining procedure. When the cordless handset interruption determining procedure is terminated, the control unit 11 terminates the Internet telephone connecting procedure.

Figure 8:
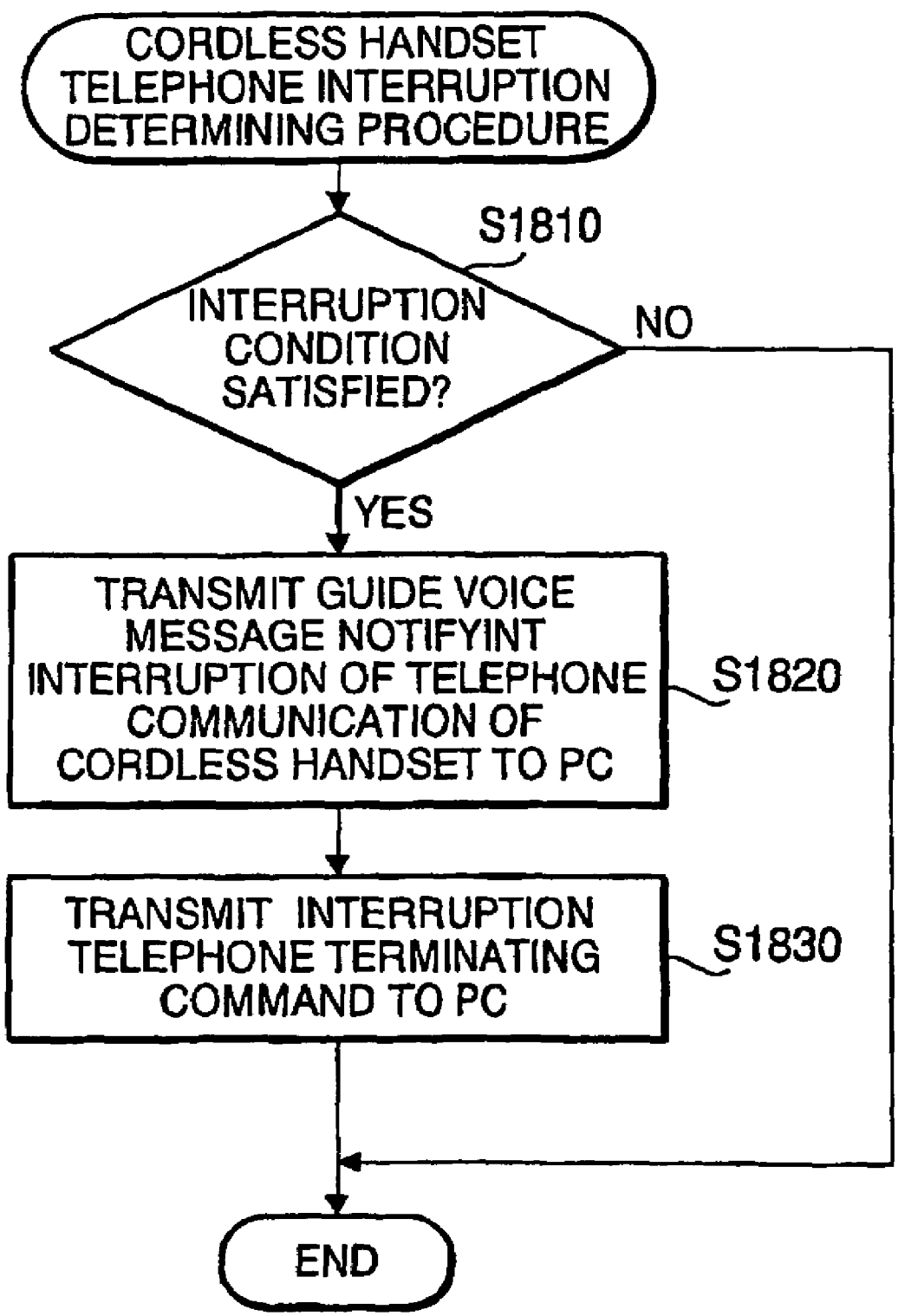
FIG. 8 shows a flowchart illustrating a cordless handset disconnection procedure executed by the control unit of the MFD of the Internet telephone system shown in FIG. 1.

FIG. 8 shows a flowchart illustrating the cordless handset interruption determining procedure executed by the control unit 11 of the MFD 2 of the Internet telephone system 1 shown in FIG. 1. In this procedure, the control unit 11 determines whether a interruption condition for interrupting the wireless communication is satisfied. Specifically, when the remaining capacity of the battery 37 periodically transmitted with a notification signal from the cordless handset 4 to the MFD 2 is lower than the minimum capacity necessary for maintaining the wireless communication, or when the signal reception level of the electromagnetic wave is lower than the minimum level for maintaining the wireless communication well (e.g., when the cordless handset 4 is located out of a communicable area, the control unit 11 determines that the interruption condition is satisfied.

When the control unit 11 determines that the interruption condition is satisfied (S1810: YES), control proceeds to S1820, where the control unit 11 notifies the calling station that the wireless communication is to be interrupted. Specifically, in this procedure, a control signal for reproducing a "communication interruption message" is transmitted to the recording/reproducing unit 12. Then, the message reproducing device 12a of the recording/reproducing unit 12, which receives the control signal, starts reproducing the interruption notification message.

Then, a control signal for switching the source of the audio signal to be transmitted to outside to the recording/reproducing unit 12 is transmitted to the route switching unit 19. When the route switching unit 19 receives such a control signal, it switches the source to the recording/reproducing unit 12, thereby the interruption message is transmitted to the calling station through the audio I/F 18. It should be noted that the interruption message is for notifying that the wireless communication is to be interrupted before it is actually interrupted. When the procedure in S1820 is finished, control proceeds to S1830, where the control unit 11 transmits the Internet telephone terminating command to the PC 3, and terminates the cordless handset interruption determining procedure.

When the control unit 11 determines that the interruption condition is not satisfied (S1810: NO), the control unit 11 terminates the cordless handset interruption determining procedure.

Back to FIG. 4, when the control unit 11 determines that the cordless handset 4 is not busy (S1110: NO), the control unit 11 terminates the Internet telephone connecting procedure.

Internet Telephone Connecting Procedure (PC)

Figure 9:
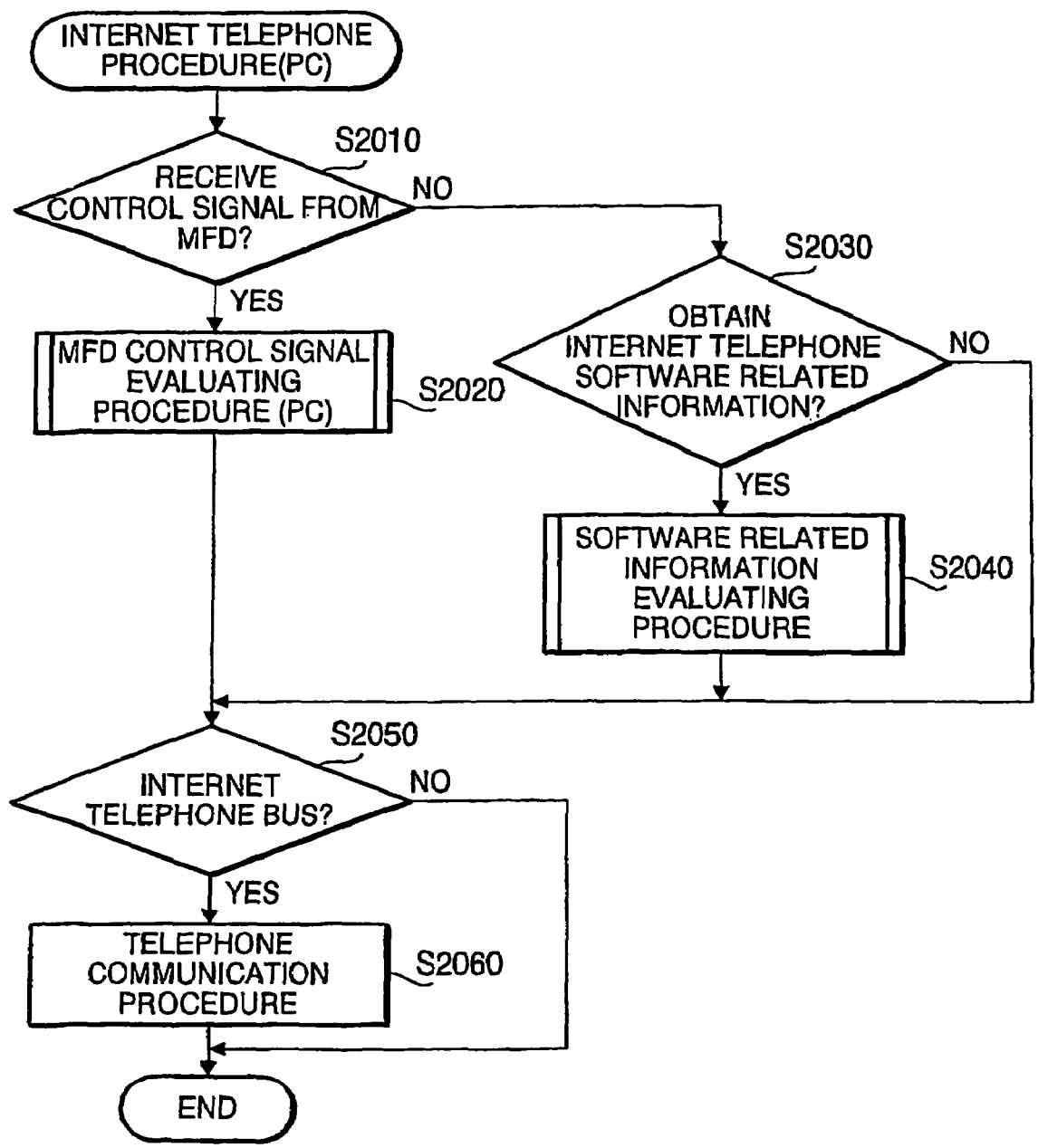
FIG. 9 shows a flowchart illustrating an Internet telephone connecting procedure executed by the control unit of a personal computer shown in FIG. 1.

FIG. 9 shows a flowchart illustrating an Internet telephone connecting procedure executed by the control unit 21 of the PC 3 shown in FIG. 1. This procedure is repeatedly executed when the PC operates (i.e., is powered ON). When the Internet telephone connecting procedure is executed, the control unit 21 determines whether a control signal is received from the MFD 2 in S2010. When the control unit 21 determines that the control signal is received (S2010: YES), an MFD control signal evaluating procedure is executed in S2020. When the MFD control signal evaluating procedure is finished, the control proceeds to S2050.

Figure 10:
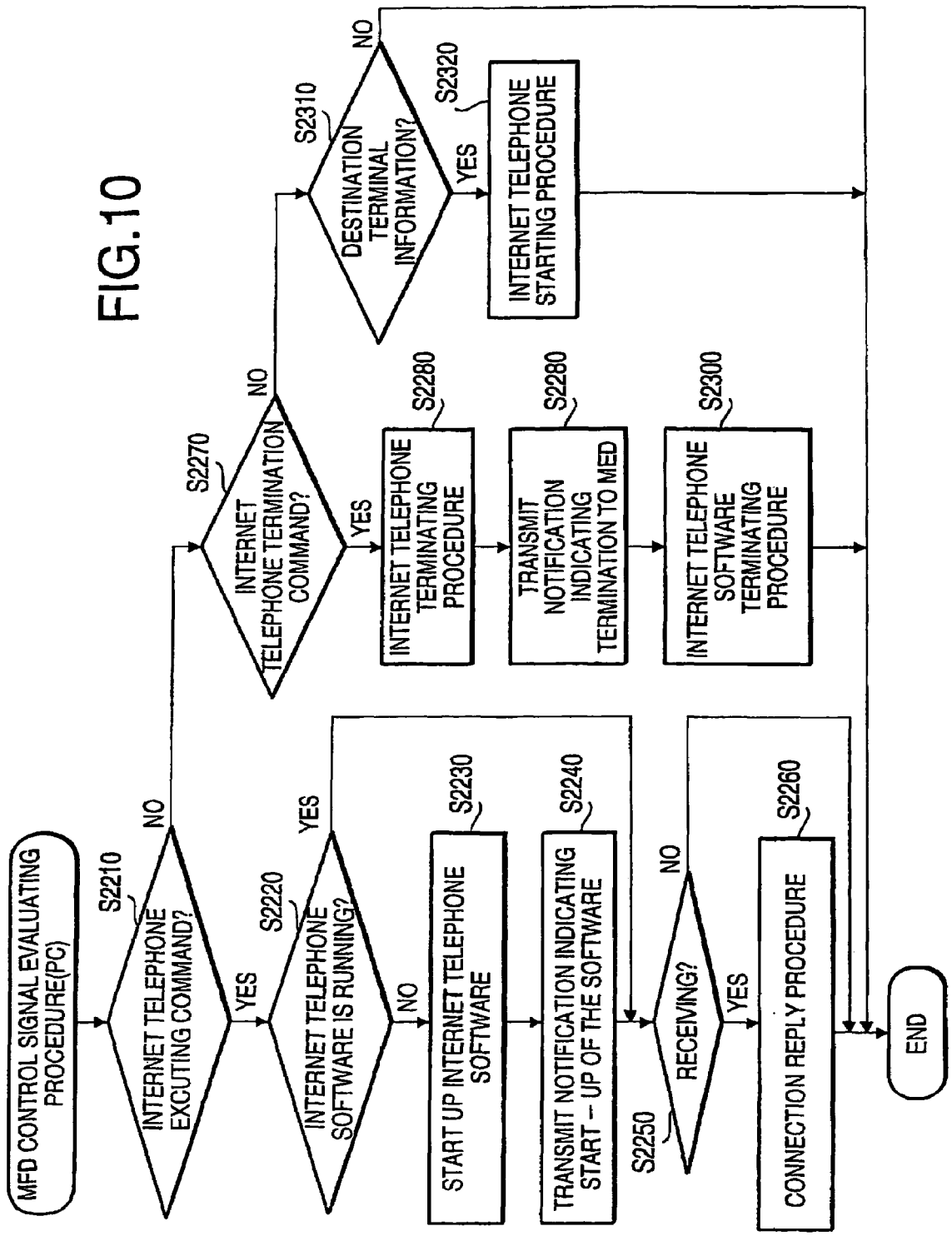
FIG. 10 shows a flowchart illustrating an MFD control signal evaluating procedure executed by a control unit of a PC (personal computer) shown in FIG. 1.

FIG. 10 shows a flowchart illustrating the MFD control signal evaluating procedure executed by the control unit 21 of the PC 3 shown in FIG. 1. In S2210, the control unit 21 determines whether the control signal represents the Internet telephone executing command. When the control unit 21 determines that the control signal represents the Internet telephone executing command (S2210: YES), control proceeds to S2220, where the control unit 21 determines whether the Internet telephone software is running.

When the control unit 21 determines that the Internet telephone software is not running (S2220: NO), control proceeds to S2230 and the Internet telephone software is started. When the Internet telephone software starts up, control proceeds to S2240, where the control unit 21 transmits the notification indicating the start-up of the Internet telephone software is transmitted to the MFD 2. When step S2240 is finished, the control proceeds to S2250.

When the control unit 21 determines that the Internet telephone software is currently running (S2220: YES), control proceeds to S2250, where the control unit 21 determines whether a call from another Internet terminal is being received. When the control unit 21 determines that the call is being received (S2250: YES), control proceeds to S2260, wherein the control unit 21 executes a connecting/replying procedure, and then terminates the MFD control signal evaluating procedure.

When the control unit 21 determines that no call is being received (S2250: NO), the control unit 21 terminates the MFD control signal evaluating procedure.

When the control unit 21 determines that the control signal does not represent the Internet telephone executing command (S2210: NO), the control unit 21 determines whether the command represents the Internet telephone terminating command in S2270. When the control unit 21 determines that the control signal represents the Internet telephone terminating command (S2270: YES), control proceeds to S2280, where the control unit 21 executes the Internet telephone disconnecting procedure.

In the Internet telephone disconnecting procedure, the established connection with respect to the calling station (the other Internet terminal) is released (i.e., the logical transmission paths is disconnected) so that the voice communication using the Internet telephone function is terminated. After the Internet telephone disconnecting procedure is finished, control proceeds to S2290, wherein the control unit 21 transmits the Internet telephone termination notification to the MFD 2. Thereafter, control proceeds to S2300, where the control unit 21 terminates the Internet telephone software, and terminates the MFD control signal evaluating procedure.

When the control unit 21 determines that the control signal does not represent the Internet telephone terminating command (S2270: NO), the control unit 21 determines whether the control signal represents the terminal information of the calling station in S2310. When the control unit 21 determines that the control signal represents the terminal information of the calling station (S2310: YES), control proceeds to S2320, where the Internet telephone starting procedure is started. In this procedure, the control unit 21 establishes a connection (i.e., the connection of the logical transmission path) with the calling station (i.e., the Internet terminal) with which the data communication can be performed through the Internet 200. After the Internet telephone starting procedure is finished, the MFD control signal evaluating procedure is terminated.

When the control unit 21 determines that the control signal does not represent the terminal information of the calling station (S2310: NO), the control unit 21 terminates the MFD control signal evaluating procedure.

Back to FIG. 9, when the control unit 21 determines that the control signal is not received from the MFD 2 (S2010: NO), control proceeds to S2030, where the control unit 21 determines whether the information related to the Internet telephone software is obtained. When the control unit 21 determines that the information related to the Internet telephone software (S2030: YES), control proceeds to S2040, where the control unit 21 executes the Internet telephone software related information evaluating procedure. After the procedure is finished, control proceeds to S2050.

Figure 11:
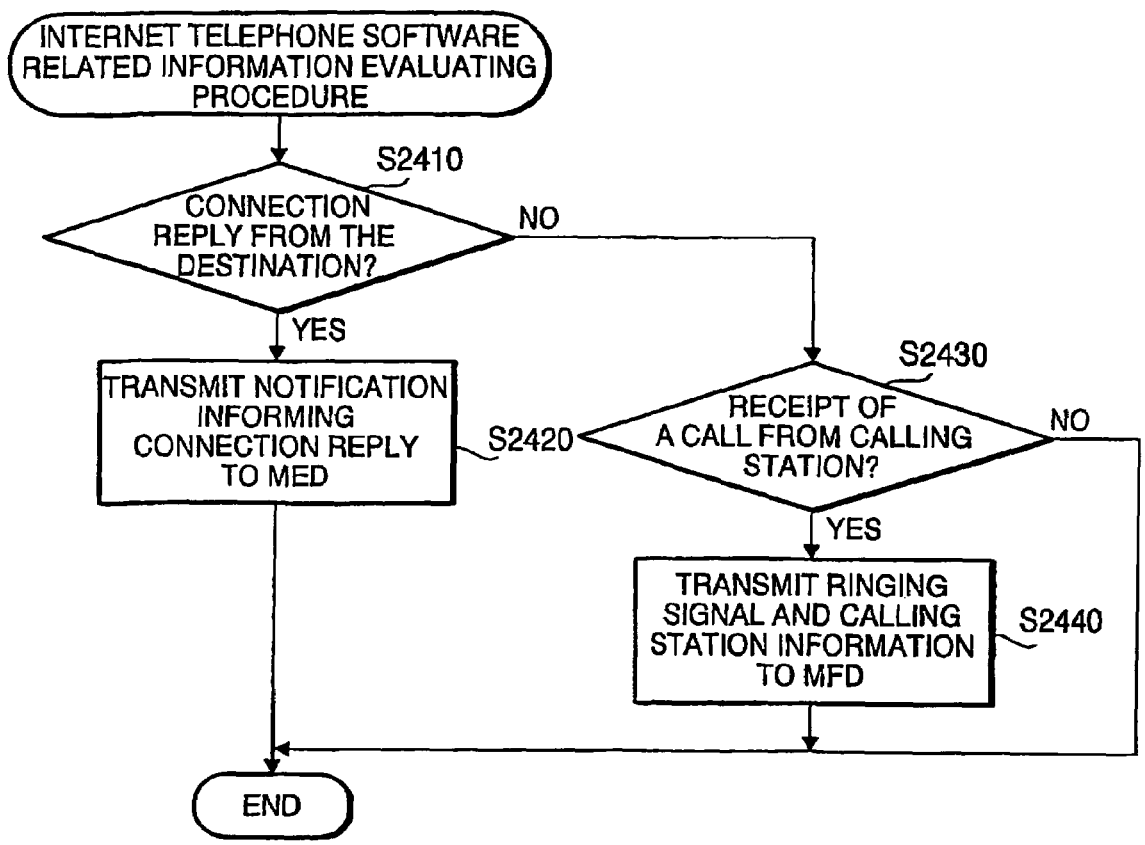
FIG. 11 shows a flowchart illustrating a call software related information evaluating procedure executed by the control unit of the PC shown in FIG. 1.

FIG. 11 shows a flowchart illustrating the Internet telephone software related information evaluating procedure executed by the control unit 21 of the PC 3 shown in FIG. 1. In this procedure, the control unit 21 determines whether the received information represents the connection response from the calling station in S2410. When the control unit 21 determines that the information represents the connection response from the calling station (S2410: YES), control proceeds to S2420, where the control unit 21 transmits a connection response notification to the MFD 2, and terminates the Internet telephone software related information evaluating procedure. When the control unit 21 determines that the information does not represent the connection response from the calling station (S2410: NO), control proceeds to S2430, where the control unit 21 determines whether the information is a call from the calling station. When the control unit 21 determines that the information comes from the calling station (S2430: YES), control proceeds to S2440, where the control unit 21 transmits the ringing signal and the calling station data to the MFD 2, and terminates the Internet telephone software related information evaluating procedure. When the control unit 21 determines that the information is not the call from the calling station (S2430: NO), the control unit 21 terminates the Internet telephone software related information evaluating procedure.

Back to FIG. 9, when the control unit 21 determines that the Internet telephone software related information is not obtained (S2030: NO), control proceeds to S2050.

In S2050, the control unit 21 determines whether the Internet telephone communication is currently performed. When the control unit 21 determines that the Internet telephone communication is currently performed (S2050: YES), control proceeds to S2060, where the Internet telephone transmitting/receiving procedure is executed. In this procedure, based on the audio signal transmitted from the MFD 2 through the audio cable 300 and the audio I/F 24, packet data is generated, which is transmitted to the Internet terminal (i.e., the calling station) with which the connection is established through the communication unit 23 and the Internet 200. Further, the audio signal, which is generated based on the packet data transmitted from the Internet terminal (i.e., the calling station) through the Internet 200 and the communication unit 23 is transmitted to the MFD 2 through the audio I/F 24 and the audio cable 300. After the Internet telephone transmitting/receiving procedure is finished, the control unit 21 terminates the Internet telephone connecting procedure. When the control unit 21 determines that the Internet telephone communication is not being performed (S2050: NO), the control unit 21 terminates the Internet telephone connecting procedure.

Internet Telephone Procedure in Cordless Handset

Next, an Internet telephone procedure executed by the control unit 31 of the cordless handset 4 will be described with reference to FIGS. 12 through 14.

Figure 12:
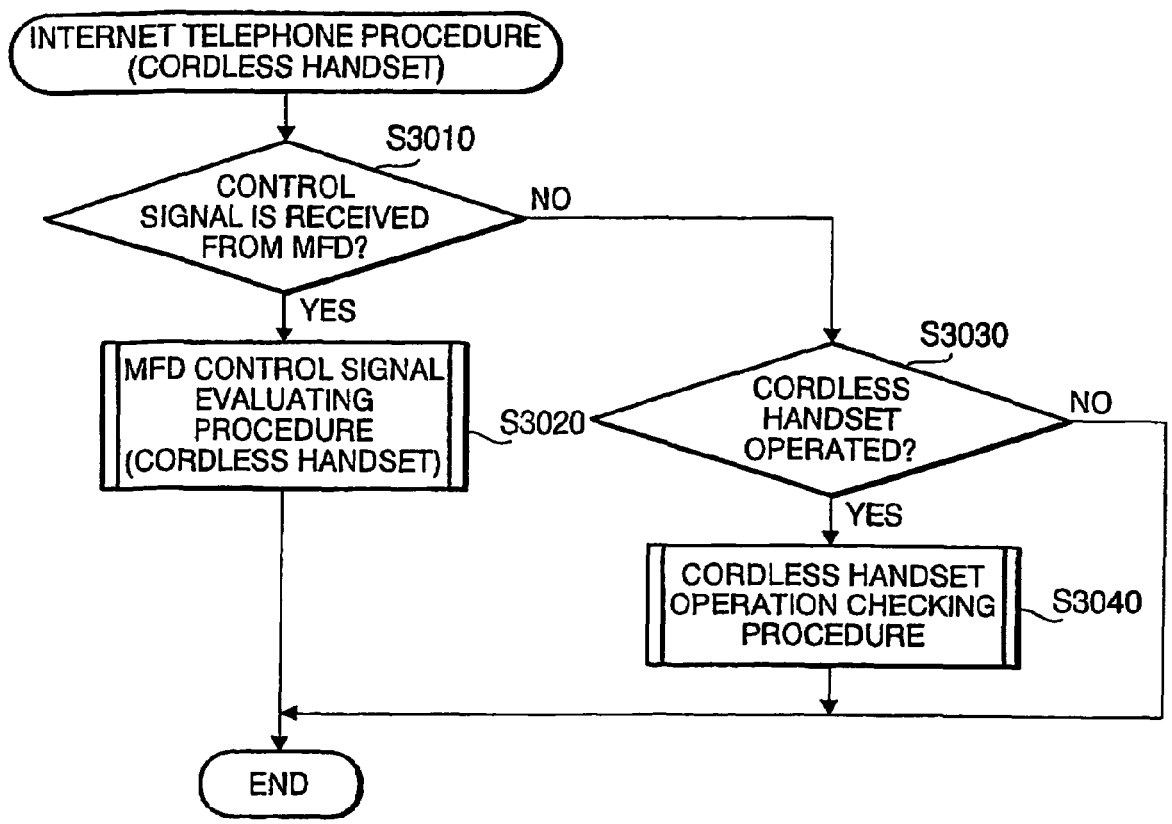
FIG. 12 shows a flowchart illustrating an Internet call procedure executed by a control unit of a cordless handset shown in FIG. 1.

FIG. 12 shows a flowchart illustrating the Internet telephone procedure executed by the control unit 31 of the cordless handset 4 shown in FIG. 1. This procedure is repeatedly executed when the cordless handset 4 operates (i.e., is powered ON).

In this procedure, the control unit 31 determines whether the control signal is received from the MFD 2 in S3010. When the control unit 31 determines that the control signal is received from the MFD 2 (S3010: YES), the control unit 31 executes an MFD control signal evaluating procedure (S3020). When the MFD control signal evaluating procedure is finished, the control unit 31 terminates the Internet telephone procedure.

Figure 13:
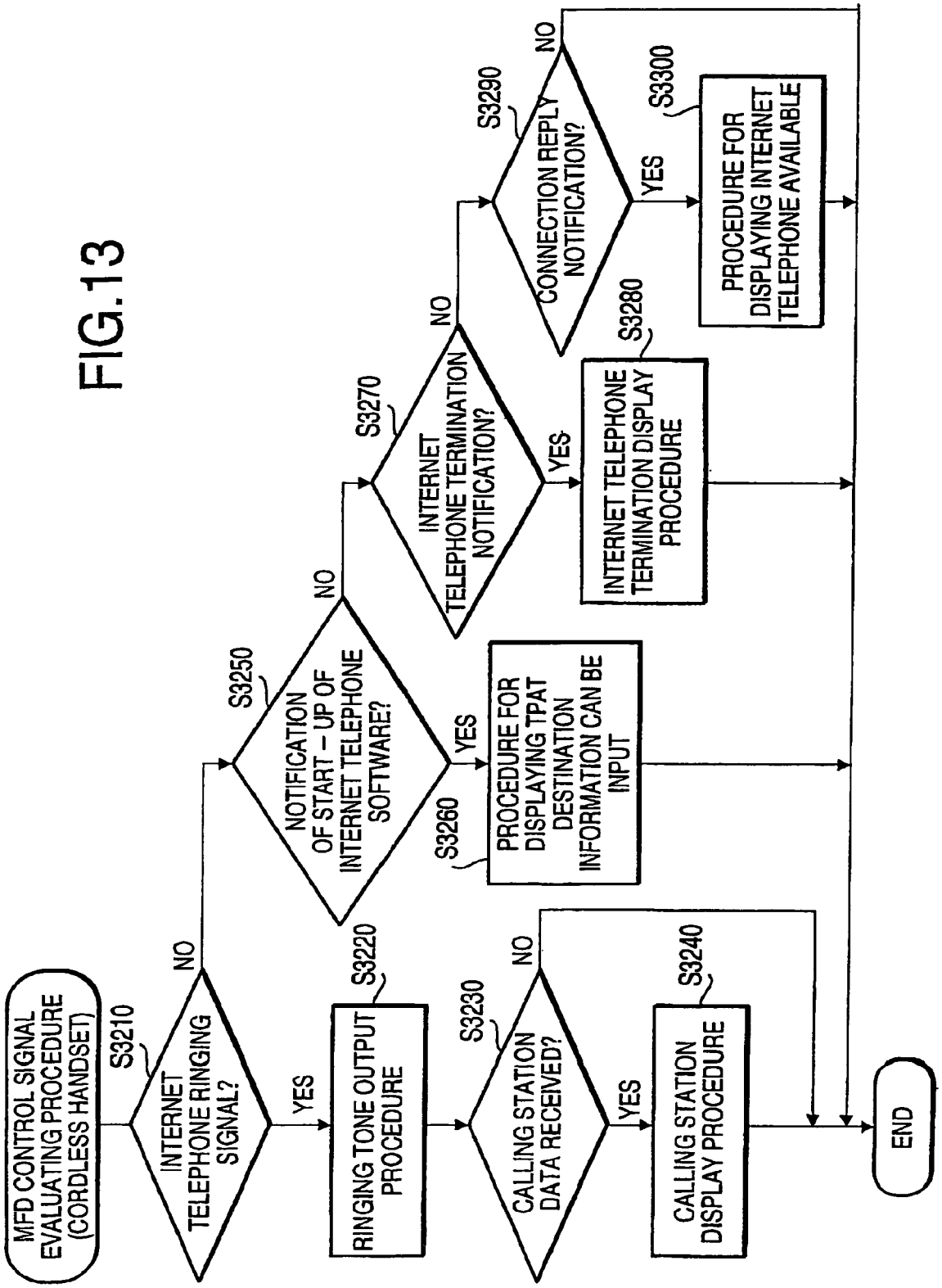
FIG. 13 shows a flowchart illustrating an MFD control signal evaluating procedure executed by the control unit of the cordless handset shown in FIG. 1.

FIG. 13 shows a flowchart illustrating an MFD control signal evaluating procedure executed by the control unit of the cordless handset shown in FIG. 1. In S3210, the control unit 31 determines whether the received signal is the Internet telephone calling signal. When the control unit 31 determines that the received signal is the Internet telephone calling signal (S3210: YES), control proceeds to S3220, where the control unit 31 executes an Internet telephone ringing procedure. In this procedure, the ringing tone is reproduced in the reproducing unit 34, and the ringing sound is output by the speaker unit 35.

In S3230, the control unit 31 determines whether the calling station data is currently received. When the control unit 31 determines that the calling station data is being received (S3230: YES), the control unit 31 executes a calling station display procedure in S3240. In this procedure, the calling station data is displayed on the display panel 33b. After the calling station display procedure is finished, the MFD control signal evaluating procedure is terminated. When the control unit 31 determines that the calling station data is not received (S3230: NO), the control unit 31 terminates the MFD control signal evaluating procedure.

When the control unit 31 determines that the received signal is not the Internet telephone calling signal (S3210: NO), control proceeds to S3250, where the control unit 31 determines whether the received signal represents the Internet telephone software starting notification. When the control unit 31 determines that the received signal represents the Internet telephone software starting notification (S3250: YES), the control unit 31 executes a procedure for displaying that the calling station information can be input. In this procedure, the a message indicating the calling station information can be input is displayed on the display panel 33b. After this procedure is terminated, the control unit 31 terminate the MFD control signal evaluating procedure.

When the control unit 31 determines that the received signal does not represent the Internet telephone software start notification (S3250: NO), the control unit 31 determines whether the received signal represents the Internet telephone termination notification (S3270). When the control unit 31 determines that the received signal represents the Internet telephone termination notification (S3270: YES), the control unit 31 executes the Internet telephone termination displaying procedure, in which a message indicating that the Internet telephone communication is terminated is displayed on the display panel 33b. After the Internet telephone termination displaying procedure is finished, the control unit 31 terminates the MFD control signal evaluating procedure.

When the control unit 31 determines that the received signal does not represent the Internet telephone termination notification (S3270: NO), the control unit 31 determines whether the signal represents the connection response notification in S3290. When the control unit 31 determines that the received signal represents the connection response notification (S3290: YES), the control unit 31 executes the Internet telephone availability notification procedure in S3300. In this procedure, a message indicating that the Internet telephone communication can be performed is displayed on the display panel 33b. After the Internet telephone availability display procedure is terminated, the MFD control signal evaluating procedure is terminated.

When the control unit 31 determines that the signal does not represent the connection response notification (S3290: NO), the control unit 31 terminates the MFD control signal evaluating procedure.

In FIG. 12, the control unit 31 determines that the control signal is not received from the MFD 3 (S3010: NO), the control unit 31 determines, in S3030, whether the operation keys 33a are operated. When the control unit 31 determines that the operation keys 33a are operated (S3030: YES), the control unit 31 executes a cordless handset operation checking procedure in S3040. When the cordless handset operation checking procedure is terminated, the control unit 31 terminates the Internet telephone procedure.

Figure 14:
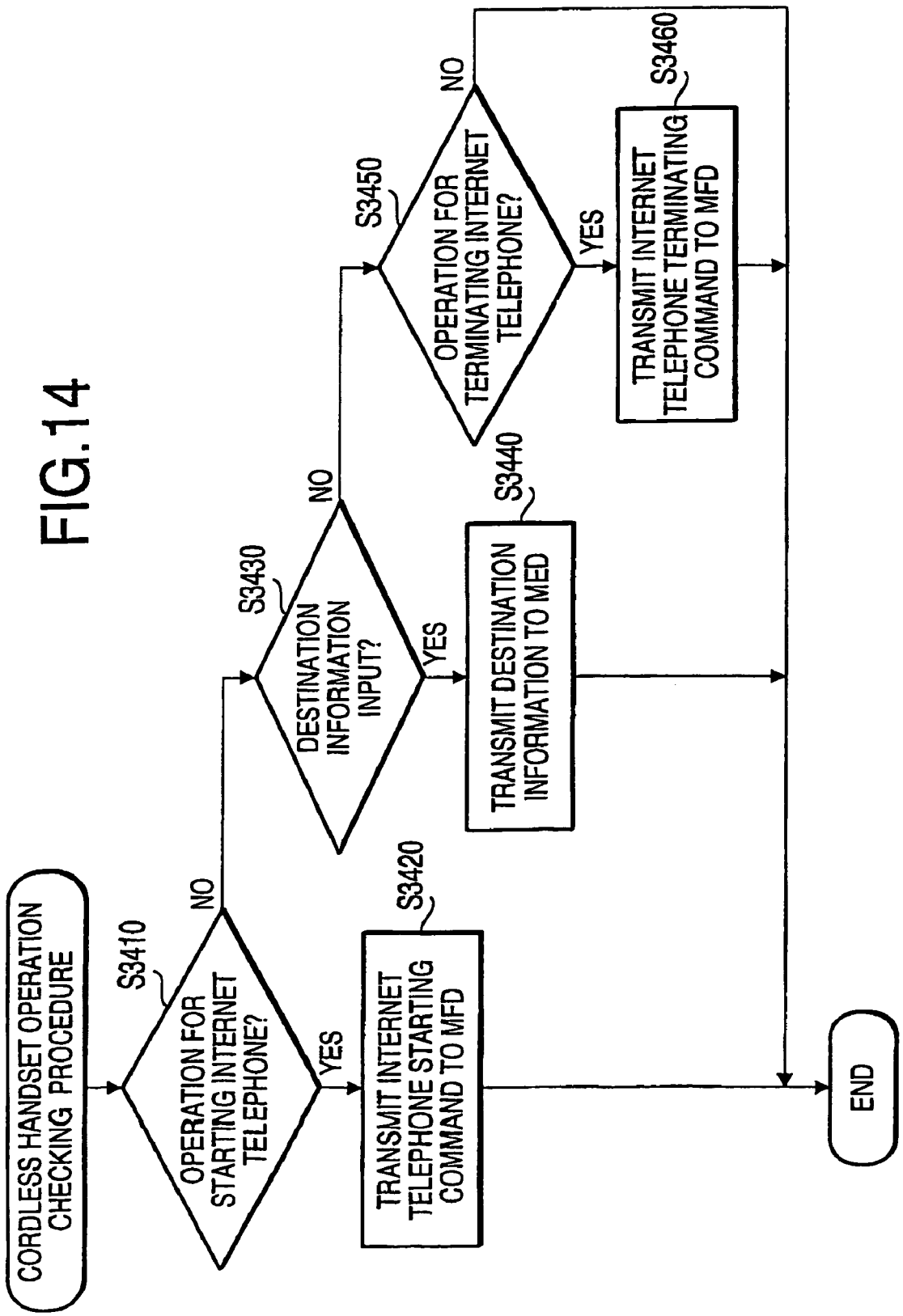
FIG. 14 shows a flowchart illustrating a handset operation determining procedure executed by the control unit of the cordless handset shown in FIG. 1.

FIG. 14 shows a flowchart illustrating the cordless handset operation checking procedure executed by the control unit 31 of the cordless handset 4 shown in FIG. 1. When the control unit 31 determines that the operation is the Internet telephone starting operation (S3410: YES), control proceeds to S3420, where the control unit 31 transmits the Internet telephone starting command to the MFD 2, and terminates the cordless handset operation checking procedure.

When the control unit 31 determines that the operation is not the Internet telephone starting operation (S3410: NO), control proceeds to S3430, where the control unit determines whether the operation is for inputting the destination terminal information. When the control unit 31 determines that the operation is the Internet telephone start operation (S3410: YES), control proceeds to S3420, where the control unit 31 transmits the Internet telephone starting command to the MFD 2, and terminates the cordless operation checking procedure.

When the control unit 31 determines that the operation is not the Internet telephone start operation (S3410: NO), the control unit 31 determines whether the operation is for inputting the destination terminal information. When the control unit 31 determines that the operation is for inputting the destination terminal information (S3430: YES), control proceeds to S3440, where the control unit 31 transmits the destination terminal information to the MFD 2, and terminates the cordless handset operation checking procedure.

When the control unit 31 determines that the operation is not for inputting the destination terminal information (S3430: NO), the control unit 31 determines whether the operation is the Internet telephone terminating operation. When the control unit 31 determines that the operation is for terminating the Internet telephone communication (S3450: YES), the control unit 31 transmits the Internet telephone terminating command to the MFD 2 and then terminates the cordless handset operation checking procedure.

When the controller determines the operation is not the Internet telephone terminating operation (S3450: NO), the control unit 31 terminates the cordless handset operation checking procedure.

In FIG. 12, when the control unit 31 determines that the operation keys 33a are not operated (S3030: NO), the control unit 31 terminates the Internet telephone procedure.

According to the Internet telephone system 1 described above, when the user operates the MFD 2 or the cordless handset 4 to start the telephone communication, the MFD 2 transmits the Internet telephone executing command to the PC 3 in S1030 (FIG. 4), and the PC 3 transmits/receives the audio signal with an Internet terminal.

In S1040 of FIG. 4, the transmission path of the audio signal can be switched from the NCU 17 to the audio I/F 18.

When the transmission path is switched to the audio I/F 18, the voice/sound which is generated based on the audio signal transmitted from outside is output from the transmission/reception device such as the handset 14, audio input/output unit 15, or cordless handset 4. Further, the audio signal input through the handset 14, audio input/output unit 15, or cordless handset 4 is transmitted to outside through the audio I/F 18.

According to the Internet telephone system 1, the MFD 2 is connected with the PC 3 which can be connected to the Internet 200 with the audio cable 300 that transmits the audio signal and the control signal cable 301 that transmits control signals.

Therefore, only by operating the MFD 2 or the cordless handset 4 to start the Internet telephone communication, the user can start the Internet telephone communication through the PC 3. That is, the user can use the MFD 2 as a terminal of the Internet telephone. In this case, the use is not required to operate the PC 3 to connect to/disconnect from the Internet 200 since the control signals are transmitted from the MFD 2 to the PC 3.

Further, when the user input the information designating a destination terminal to which the user intends to make a call using the operation unit of the MFD 2 or the cordless handset 4, the MFD 2 transmits the input information to the PC 3 (S1620). Then, the PC 3 connects to the terminal designated by the user, thereby the Internet telephone communication being initiated.

Accordingly, when the user makes a call using the Internet telephone function, it is not necessary to operate the PC 3 to connect to the Internet terminal before the user starts the voice/sound communication using the handset 14 or the cordless handset 4.

Further, when the user operates the MFD 2 or the cordless handset 4 to stop the telephone communication, the MFD 2 transmits the Internet telephone terminating command (S1670) to the PC 3. Then, the PC 3 terminates the transmission/reception of the audio signal, and the Internet telephone communication is terminated.

When the Internet telephone communication is terminated, the user needs to terminate the Internet telephone function of the Internet terminal. In the system as shown in FIG. 1, the Internet telephone function of the PC 3 should be terminated. However, when the user talks using the handset 14 of the cordless handset 4, due to the similarity of the operation as in the normal telephone system, user may forget to operate the PC 3 to terminate the Internet telephone function thereof. If the Internet connection is a metered rate accounting system (e.g., a dial-up connection), when the PC 3 is kept connected, the communication fee is unnecessarily increased.

According to the embodiment described above, only by operating the handset 14 or the cordless handset 4 to terminate the Internet telephone communication, the control command is transmitted to the PC 3 and the Internet telephone function of the PC 3 is automatically terminated. Therefore, the accounting problem as described above can be avoided.

According to the embodiment, when the Internet telephone function is not used, the transmission path (i.e., the destination/source of the audio signal) is set to use the NCU 17. Therefore, even if the Internet telephone function is implemented, the normal telephone communication is not prevented since whenever the user intends to use the normal telephone function, the user can use the handset 14 or the cordless handset 4 promptly.

According to the embodiment, when an Internet telephone call is received, the ringing tone is output at the MFD 2. It is convenient since the user can recognize the reception of the Internet call similar to the reception of the normal telephone call.

According to the embodiment, the Internet telephone system can be implemented with the answering machine function as is employed in the normal telephone system. In this case, the message to be transmitted to the calling station and the message of the caller are stored in the recording/reproducing unit 12 of the MFD 2. Thus, the user can operate the Internet telephone system similarly to the normal telephone system.

According to the embodiment, the cordless handset 4 is provided, which can be used even if the Internet telephone communication is performed. Such a configuration is very convenient for the user since the user can move to various places and use the Internet telephone function.

Modification of Embodiment

The invention is not limited to the above-described exemplary embodiment, and can be modified in various ways without departing from the scope of the invention.

In the above-described embodiment, the Internet telephone function shown in FIGS. 4 through 8 is realized by the computer system which is a part of the MFD 2 (i.e., the control unit 11 of the MFD 2). The invention need not be limited to such a configuration, and the procedures shown in FIGS. 4 through 8 may be executed by a computer system which is connected with the MFD 2 with wired/wireless signal transmission paths.

In the above-described embodiment, the Internet telephone function shown in FIGS. 12 through 14 is realized by the computer system which is a part of cordless handset 4 (i.e., the control unit 31). The invention need not be limited to such a configuration, and the procedures shown in FIGS. 12 through 14 may be executed by a computer system which is connected with the cordless handset 4 with wired/wireless signal transmission paths.

In the above-described embodiment, when the user operate the operation keys 33a of the user I/F 33 of the cordless handset 4, the Internet telephone communication is started/terminated, and the voice/sound is transmitted/received through the transmission/reception unit 32. Optionally, the MFD 2 is configured such that, when the user operates the operation keys 13a of the user I/F 13 of the MFD 2, the Internet telephone communication is started/terminated, and the voice/sound is transmitted/received through the handset 14 and/or the speaker 15a and microphone 15b of the audio input/output unit 15. In such a case, the control unit 11 of the MFD 2 may transmit the Internet telephone starting command to the PC 3 when the user operates the operation keys 13a to start the Internet telephone communication.

The Internet telephone system may be configured that the Internet telephone communication is started/terminated when a predetermined operation or predetermined series of operations are executed, examples of which may be a predetermined button held depressed for a predetermined period or a plurality of buttons operated in a predetermined order.

In the above-described embodiment, the ringing tone is output by the speaker unit 35 (S3220). The invention need not be limited to such a configuration. That is, the ringing tone may be output by one or both of the speaker unit 35 and the speaker 15a, and a message notifying the reception of a call may be displayed on one or both of the display panel 13b of the user I/F 13 and the display panel 33b of the cordless handset 4.

According to the above-described embodiment, when the remaining capacity of the battery 37 is lower than the minimum capacity for operation, or when the radio field intensity of the electromagnetic wave is lower than the predetermined value, a condition for disconnection is regarded to be satisfied (S1810). The invention is not limited to such a configuration and one of the above two items may not be checked, and/or another item may be examined.

According to the above-described embodiment, when the radio field intensity of the electromagnetic wave is lower than the predetermined value, a condition for disconnection is regarded to be satisfied (S1810). This may be modified such that the disconnection condition may be regarded to be satisfied only when the radio field intensity becomes approximately zero.

Figure 15:
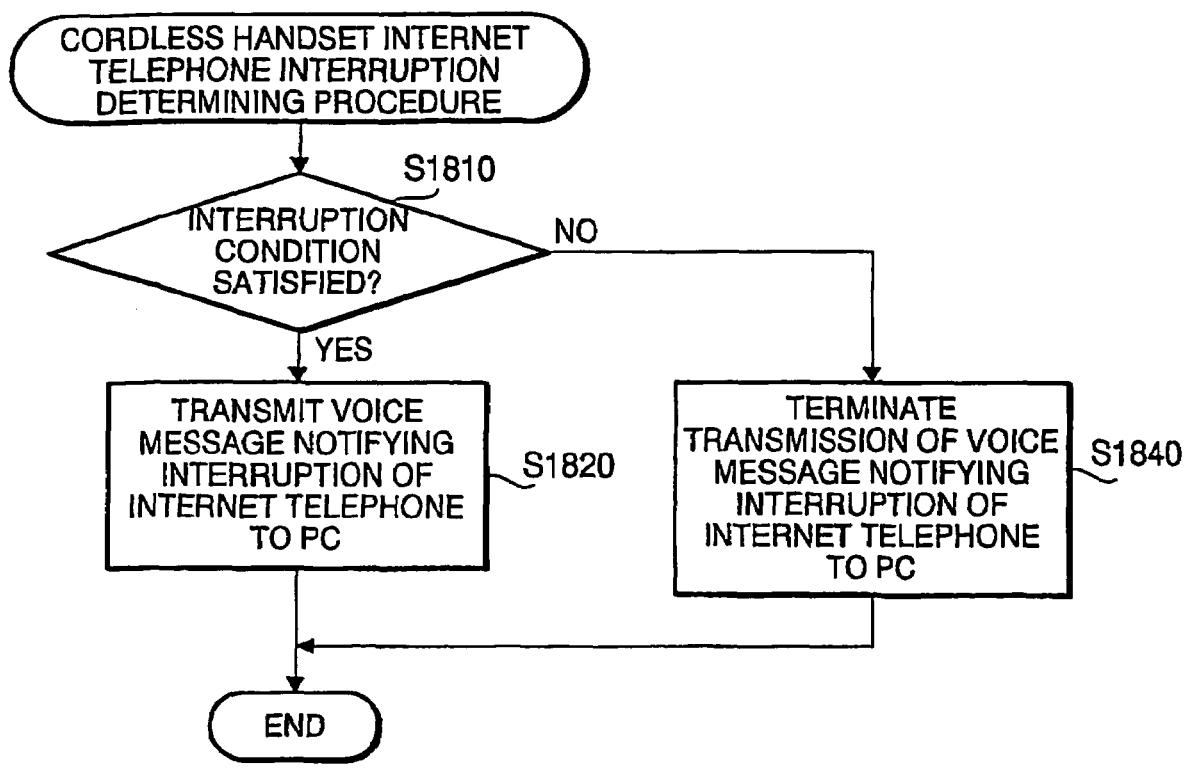
FIG. 15 shows a flowchart illustrating a cordless handset disconnection procedure executed by the control unit of the MFD according to a modification of the embodiment of the invention.

In the above-described embodiment, in S1830, the Internet telephone communication is terminated. However, the invention need not be limited to such a configuration. For example, as shown in FIG. 15, S1830 of FIG. 8 is eliminated, the transmission of the cordless handset disconnection guiding voice message may be repeatedly output in S1820, and step S1840 may be added when the disconnection condition is satisfied (S1810: YES). In S1840, the transmission of the cordless handset disconnection guiding voice message is terminated.

It should be noted that, in S1840, no operation is executed if S1820 (i.e., the transmission of the cordless handset disconnection guiding voice message) has not been previously executed. With this modification, the user of the cordless handset 4 may continue the telephone communication by charging or exchanging the battery 37 of the cordless handset 4, by moving to a location where the radio field intensity has a sufficient quantity, or by using another device (e.g., the handset 14 or the audio input/output unit 15).

In the above-described embodiment, the notification is made in S1820, and thereafter, the voice/sound communication is terminated in S1830. However, the invention is not limited to such a configuration. For example, step S1830 is omitted and S1820 is repeated until the operation for terminating the voice/sound communication at the calling station. With this modification, the user of the cordless handset 4 may continue the telephone communication by moving to a location where the radio field intensity has a sufficient quantity or by using another device (e.g., the handset 14 or the audio input/output unit 15).

Figure 16:
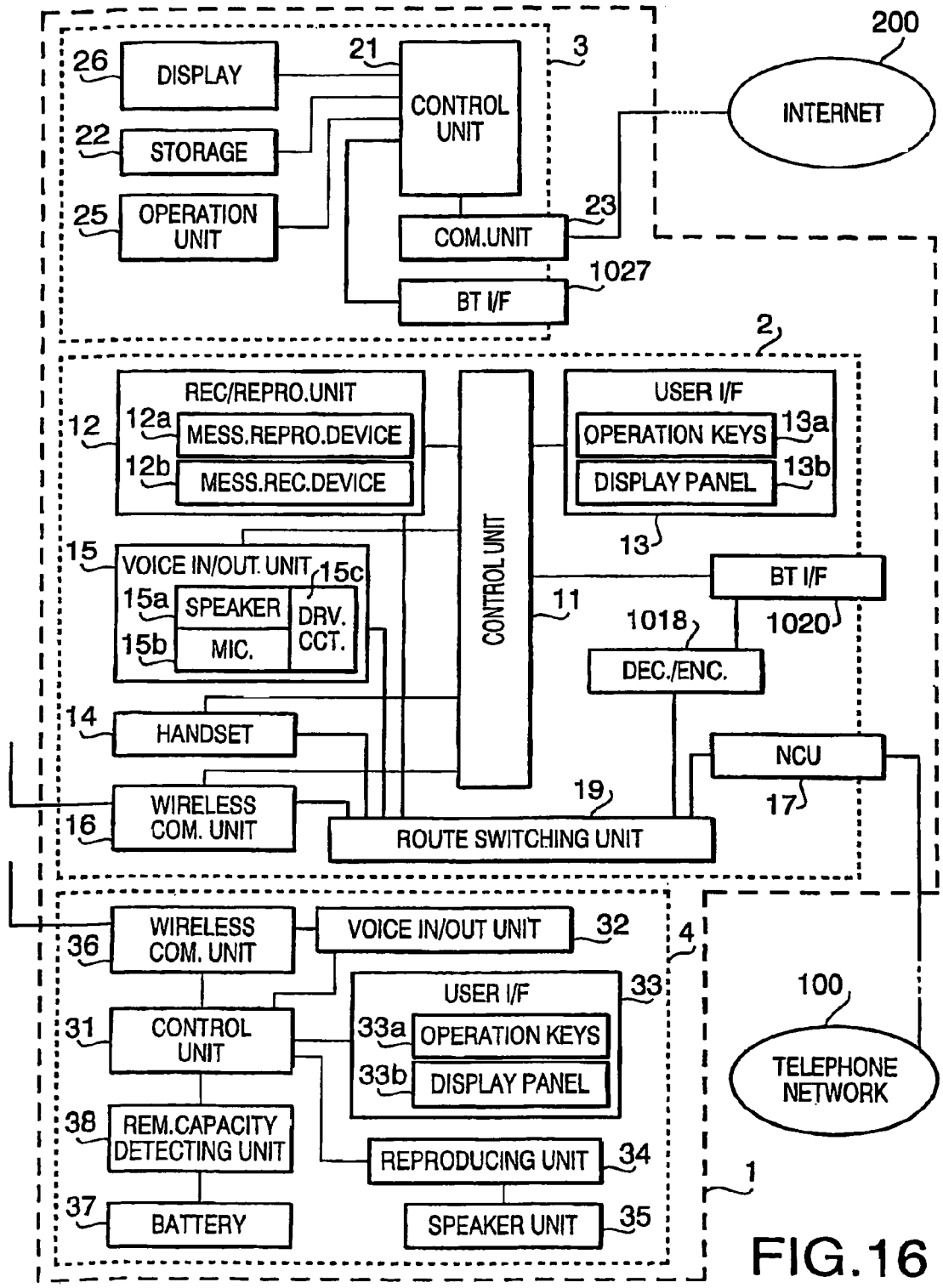
FIG. 16 is a block diagram showing a configuration of an Internet telephone system according to a further modification of the embodiment of the invention.

In the above-described embodiment, the PC 3 and the MFD 2 are connected with cables 300 and 301. The invention need not be limited to such a configuration, and the PC 3 and the MFD 2 can be connected with a wireless communicating system, such as the Bluetooth® system. FIG. 16 is a block diagram showing a configuration of an Internet telephone system according to a further modification of the embodiment of the invention. The Internet telephone system shown in FIG.

16 is substantially the same as the Internet telephone system 1 shown in FIG. 1, except that the audio I/F 24 and the control I/F 27 of the PC 3 are replaced with a Bluetooth Interface (I/F) 1020. Further, the control I/F 20 and the audio I/F 18 of the MFD 2 are omitted, and a Bluetooth I/F 1020 is provided. An encoder/decoder 1018 is connected to the Bluetooth I/F 1020. The encoder/decoder 1018 decodes the audio component included in the signal transmitted form the Bluetooth I/F 1020 to the Bluetooth I/F 1020, and input the decoded audio signal to the route switching unit 19. Further, the encoder/decoder 1018 encodes the audio signal transmitted from the route switching unit 19 and transmits the encoded signal to the Bluetooth I/F 1020. With this configuration, the PC 3 and the MFD 2 are connected with a wireless communicating system. Therefore, the MFD 2 can be located desired place, and functions similarly to the first embodiment. Since the MFD 2 can be located remotely from the PC 3, even if the cordless handset 4 is not provided in the MFD 2, freedom in determining the location of the MFD 2 is improved.

Second Embodiment

Figure 17:
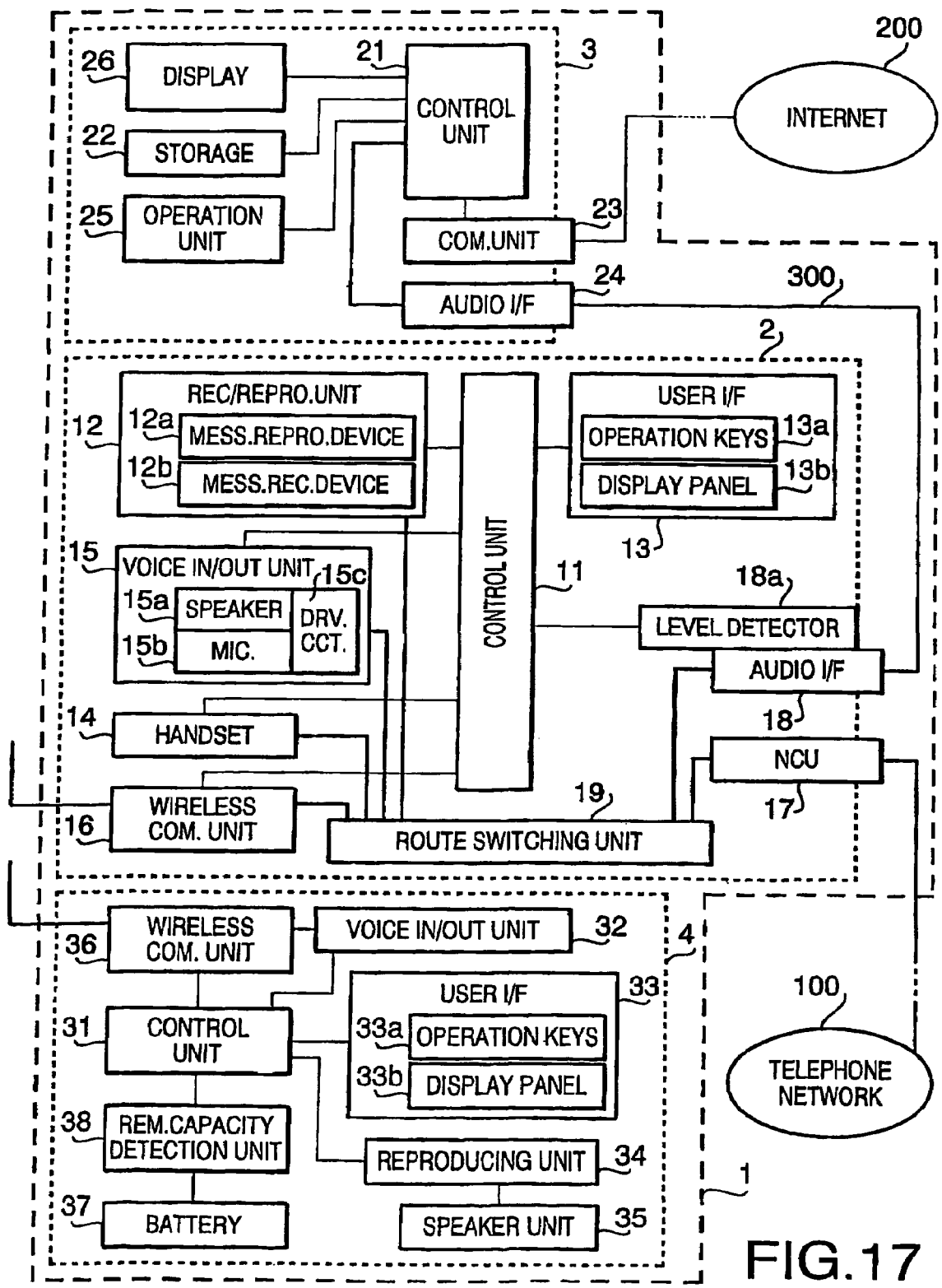
FIG. 17 is a block diagram showing a configuration of an Internet telephone system according to the second embodiment of the invention.

FIG. 17 is a block diagram showing a configuration of an Internet telephone system according to a second embodiment of the invention. In the Internet telephone system shown in FIG. 17, the control I/F 27 of the PC 3 (see FIG. 1) and the control I/F 20 of the MFD 2 are omitted. That is, the PC 3 and the MFD 2 are connected only through the audio cable 300. In this example shown in FIG. 18a, a level detector 18a is provided to the audio I/F 18 in order to detect the signal level of the audio signal input to the audio I/F 18 through the audio cable 300.

In the second embodiment, the internet telephone starting procedure is started when the user operates the operation unit 25 to designate a destination Internet terminal (i.e., a called terminal), with the Internet telephone software running on the PC 3.

The Internet telephone transmitting/receiving procedure is repeatedly executed after the Internet telephone starting procedure is executed till the Internet telephone terminating procedure is executed. With this Internet telephone transmitting/receiving procedure, the voice communication is available between the PC 3 (i.e., the MFD 2 connected to the PC 3) and the designated Internet terminal through the Internet 200.

According to the second embodiment, the Internet telephone terminating procedure is executed when the user operates the operation unit 25 to stop the Internet telephone software. Similar to the first embodiment, the Internet telephone software is designed such that the above operation for termination is performed, a release signal notifying the release of the connection (i.e., disconnection) is transmitted from the Internet terminal implemented with the Internet telephone software, and the PC 3 executes the Internet telephone terminating procedure when the release signal is received from the designated Internet terminal with which the connection was established.

Figure 18:
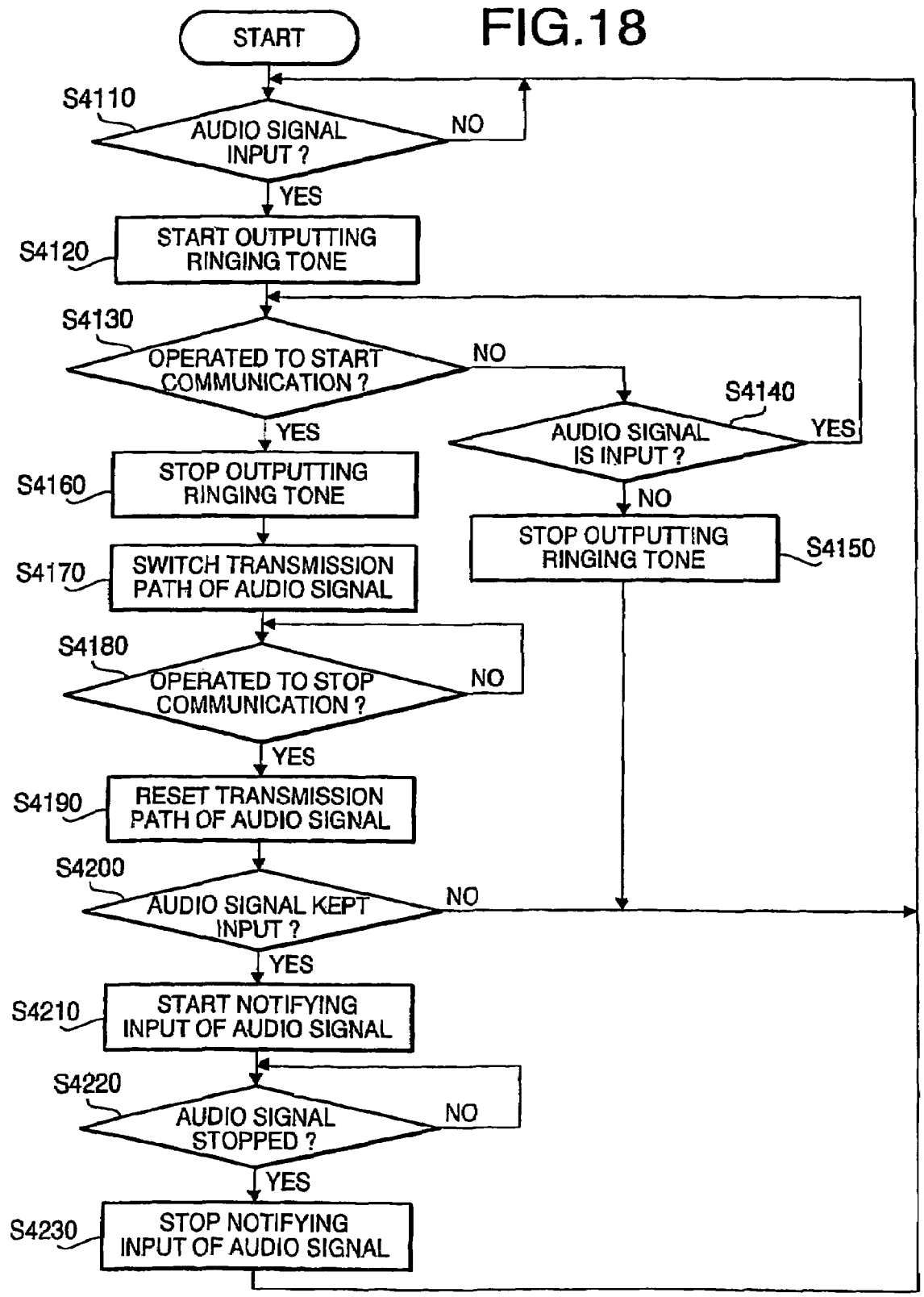
FIG. 18 is a flowchart illustrating a route switching procedure according to the second embodiment of the invention.

Now, with reference to FIG. 18, a route switching procedure executed by the control unit 11 of the MFD 2 is described. The route switching procedure is repeatedly executed when the MFD 2 is powered on.

In S4110, the control unit 11 waits for input of the audio signal through the audio I/F 18 (S4110: NO). Specifically, in this step, the control unit 11 determines that the audio signal is not input when the signal level detected by the level detector 18a is less than a predetermined level. Input of the audio signal whose signal level is not less than the predetermined threshold level implies that the Internet telephone transmit-ting/receiving procedure in accordance with the function of the Internet telephone software is executed, i.e., the Internet telephone function is currently used.

When the audio signal is input through the audio I/F 18 (S4110: YES), the control unit 11 starts outputting the ringing tone from the audio input/output unit 15. In this step, a control signal for reproducing the ringing tone is transmitted to the recording/reproducing unit 12. Then, the message reproducing device 12a starts reproducing the ringing tone. At this stage, a control signal for setting a transmission route of the audio signal from the recording/reproducing unit 12 to the audio input/output unit 15 is transmitted to the route switching unit 19. Upon receipt of the control signal, the route switching unit 19 sets the transmission route, thereby the ringing tone is output from the speaker 15a of the voice input/output unit. In this step, the control signal for reproducing the ringing tone is also transmitted to the cordless handset 4, which reproduces the ringing tone with the speaker unit 35.

In S4130, the control unit 11 checks whether an operation for starting the voice communication. In this step, whether an operation of picking up the handset 14 from the main body of the MFD 2, an operation for staring the hands free communication using the operation key 13a of the user I/F 13, or an operation for starting the voice communication using the operation key 33a of the cordless handset 4 is executed.

When the operation to start the voice communication has not done (S4130: NO), the control unit 11 checks whether the audio signal is input through the audio I/F 18 (S4140). When the audio signal is not input (S4140: NO), the control unit stops, in S4150, outputting the ringing tone which was started to be output in S4120. In this step, another control signal for stop the ringing tone is transmitted to the recording/reproducing unit 12, in which the message reproducing device 12a stops the reproduction of the ringing tone. The control signal for stopping the recording/reproducing unit 12 is also transmitted to the cordless handset 4, in which the reproducing of the ringing tone by the speaker unit 35 is stopped.

In S4140, when the audio signal is input through the audio I/F 18 (S4140: YES), control returns to S4130.

When the operation for starting the voice communication is done (S4130: YES), the control unit 11 stops outputting the ringing tone started in S4120 (S4160), which is the same as S4150.

Next, the control unit 11 switches a transmission route of the audio signal to be used for inputting/outputting the audio signal from NCU 17 to the audio I/F 18 (S4170). Further, in this step, a destination of the audio signal received from the outside, and an origin of the audio signal from which the audio signal to be transmitted comes from is switched to one of the units (i.e., the handset 14, the recording/reproducing unit 15, the wireless communication unit 16 (the cordless handset 4). Since the transmission path in side the MFD 2 is set appropriately, the Internet telephone function can be used with the MFD 2.

Next, the control unit 11 waits for the operation of finishing the voice communication (S4180: NO). In this procedure, it is checked whether one of the operations of returning the handset 14 onto the main body of the MFD 2, operating the operation keys 13a of the user I/F to finish the hands free communication and operating the operation keys 33 of the cordless handset 4 to finish the communication is executed.

When the operation to finish the communication is executed (S4180: YES), the control unit 11 switches the transmission path from the audio I/F 18 to the NCU 17 (i.e., the control unit 11 resets the transmission path) in S2190. In this procedure, a control signal for switching the transmission path used for inputting/outputting the audio signal with respect to the external device is transmitted to the route switching unit 19. Upon receipt of such a control signal, the route switching unit 19 switches the transmission path from the audio I/F to the NCU 17. By resetting the transmission path of the audio signal in the MFD 2, the voice communication on the MFD 2 is terminated (i.e., the voice communication using the internet function by the MFD 2 is prevented).

Next, the control unit 11 checks whether the audio signal is still input through the audio I/F 18 (S4200). In this step, it is determined whether the signal level of the audio signal input from the PC 3 through the audio cable 300 is kept at a level not less than the predetermined threshold level. If such a signal is kept input, the Internet telephone operation in accordance with the Internet telephone software is performed in the PC 3, and thus, the Internet telephone function is currently available in the PC 3.

In step S4200, when the audio signal is kept input through the audio I/F 18 (S4200: YES), the control unit 11 starts notifying that the audio signal is being input (S4210). In this procedure, firstly, a control signal for repeatedly reproducing a "continuous input message" is transmitted to the recording/reproducing unit 12. Then, upon receipt of such control signals repeatedly, the message reproducing device 12*a* of the recording/reproducing unit 12 repeatedly reproduces the "continuous input message". At the same time, a control signal for setting the transmission path of the audio signal from the recording/reproducing unit 12 to the audio input/output nit 15 is transmitted to the route switching unit 19. Then, the route switching unit 19 sets the transmission path, thereby the "continuous input message" is output from the speaker 15*a* of the audio input/output unit 15, repeatedly.

The "continuous input message" is a kind of error message which notifies that the audio signal is kept input through the audio I/F 18 even after the voice communication using the Internet telephone function of the MFD 2 is disabled, i.e., the Internet telephone function of the PC 3 is still available. By issuing the continuous input message, it is possible to notify the user that the Internet telephone function of the PC 3 should be terminated (i.e., the Internet telephone software should be finished in the PC 3).

Next, the control unit 11 awaits (S4220: NO) until the audio signal comes through the audio I/F 18 is stopped. In this step, until the signal level of the audio signal, which is transmitted from the PC 2 through the audio cable 300, detected by the level detector 18*a* is less than the predetermined threshold value. When the signal level becomes lower than the threshold value, it is considered that the usage of the Internet telephone function is terminated in the PC 3.

In S4220, when the audio signal is not input from the audio I/F 18 (S4220: YES), the control unit 11 terminates the notification, which was started in S4210 (S4230). In this step, a control signal for stopping the "continuous input message" is transmitted to the recording/reproducing unit 12, and the message reproducing device 12*a* of the recording/reproducing unit 12 stop reproducing the "continuous input message".

When S4230 is finished, S4150 is finished or it is determined that the audio signal is kept input in S4200 (S4200: NO), control returns to S4110.

Next, an interruption notifying procedure executed by the control unit 11 will be described with reference to FIG. 19. This procedure is repeatedly executed when the wireless communication is executed by the cordless handset 4.

In S4310, the control repeatedly checks whether a predetermined disconnection condition to terminate the wireless communication is satisfied.

When the remaining capacity of the battery 37 periodically transmitted with the notification signal from the cordless handset 4 to the MFD 2 is lower than the minimum capacity necessary for maintaining the wireless communication, or when the signal reception level of the electromagnetic wave is lower than the minimum level for maintaining the wireless communication well (e.g., when the cordless handset 4 is located out of a communicable area), the control unit 11 determines that the interruption condition is satisfied (S4310: YES).

When the control unit 11 determines that the interruption condition is satisfied (S4310: YES), control proceeds to S4320, where the control unit 11 notifies the calling station that the wireless communication is to be interrupted. Specifically, in this procedure, a control signal for reproducing a "communication interruption message" is transmitted to the recording/reproducing unit 12. Then, the message reproducing device 12*a* of the recording/reproducing unit 12, which receives the control signal, starts reproducing the interruption notification message.

Then, a control signal for switching the source of the audio signal to be transmitted to outside to the recording/reproducing unit 12 is transmitted to the route switching unit 19. When the route switching unit 19 receives such a control signal, it switches the source to the recording/reproducing unit 12, thereby the interruption message is transmitted to the calling station through the audio I/F 18. It should be noted that the interruption message is for notifying that the wireless communication is to be interrupted before it is actually interrupted. When the procedure in S4320 is finished, control proceeds to S4330, where the control unit 11 stops the voice communication. In this step, if the voice communication using the telephone network 100 is performed, an operation for terminating the voice communication is established by the operation of the operation key 33*a*. If the voice communication using the Internet telephone function is performed, the transmission path for transmitting the input/output signals with respect to the external device is switched back from the audio I/F 18 to the NCU 17. This procedure is similar to the step S4190 of FIG. 18.

As described above, according to the second embodiment, the transmission path used for inputting/outputting the audio signal from/to the external device can be switched from the NCU 17 to the audio I/F 18 in S4170 of FIG. 18. When the transmission path is switched to the audio I/F 18, the voice carried by the audio signal is input/output by the handset 14, audio input/output unit 15 or the cordless handset 4, through the audio I/F 18.

Accordingly, with the Internet telephone system 1 in which the MFD 2 is connected to the PC 3 having the Internet communication function with the audio cable 300, the Internet telephone function can be performed using the MFD 2 as the handset.

Further, the switching the transmission path to the audio I/F 18 (S4170) is executed only when the audio signal is input through the audio I/F 18. When the Internet telephone function of the PC 3 is used, the audio signal is continuously transmitted from the PC 3 through the audio cable 300 and the audio I/F 18. Therefore, when the Internet telephone function is used in the PC 3, the level detector 18*a* keeps detecting the audio signal, and the transmission path is switched to the audio I/F 18. When the Internet telephone function is not used in the PC 3, the transmission path of the audio signal is not switched to the audio I/F 18.

It is not preferable the transmission path is switched to the audio I/F 18 when the Internet telephone function is not used. For example, if the transmission path is switched to the audio I/F 18 when the normal voice communication using the telephone network 100 is performed, the voice communication based on the audio signal transmitted through the telephone network 100 is interrupted. In order to avoid such inconvenience, according to the second embodiment, the switching to the audio I/F 18 is performed only when the audio signal is input to the audio I/F 18.

According to the second embodiment, since the level detector 18a is provided to detects whether the audio signal is input to the audio I/F 18, whether the Internet function of the PC 3 is used is determined on the MFD side. That is, it is not necessary to proved additional structures to the PC 3.

Further, according to the second embodiment, the transmission path is automatically switched to the audio I/F if the operation to start the communication is performed (S4130: YES) when the audio signal is input to the audio I/F 18. Thus, when the Internet function is used in the PC 3, only by operating the PC 3 to start the Internet telephone communication, which is similar to the operation of making a telephone call using the telephone network, the voice communication using the Internet telephone communication can be started, and no particular operation for switching the transmission path is required.

Furthermore, when the operation to stop communication is performed in S4180, the transmission path of the audio signal is automatically switched to the NCU 17 (S4190) Thus, only by operating the PC 3 to finish the Internet telephone communication, which is similar to the operation of stop the normal telephone communication, the voice communication using the Internet telephone communication can be started, and no particular operation to control the MFD 2 is required.

In S4110, after the input of the audio signal through the audio I/F 18 is started (i.e., after the Internet telephone function is started to be used in the PC 3) till the operation to start the communication in S4130, or till the input of the audio signal to the audio I/F 18 is terminated, the ringing tone is output (S4120) so as to notify the user of the input of the audio signal.

After the transmission path is switched to the NCU 17 in S4190, if the audio signal is kept input (S4200: YES), it is notified to the user. That is, in S4200, the notification is made to indicate that the audio signal is kept input after the voice communication using the Internet telephone function using the MFD 2 is finished.

In the second embodiment, the PC 3 is capable of transmitting/receiving the audio signal to/from the MFD 2. However, the PC 3 cannot detect that the communication is terminated on the MFD side, and therefore, even though the user operates the MFD 2 to finish the Internet telephone communication, the PC 3 cannot finish the Internet telephone function automatically. Accordingly, the user is required to operate the PC 3 to finish the usage of the Internet telephone function. Such an operation may be forgotten due to the analogous operation of the normal telephone. In such a case, the Internet telephone function is unnecessarily kept available. If a metered-rate fee structure is employed (e.g., a dial up Internet connection), the unnecessary connection results in the communication fee increased.

In order to avoid such a situation, by notifying the connection is continued in S4210, it is ensured that the user recognizes the necessity of the disconnecting operation for the PC 3.

According to the embodiment, the cordless handset 4 is provided, which can be used even if the Internet telephone communication is performed. Such a configuration is very convenient for the user since the user can move to various places and use the Internet telephone function.

Figure 19:
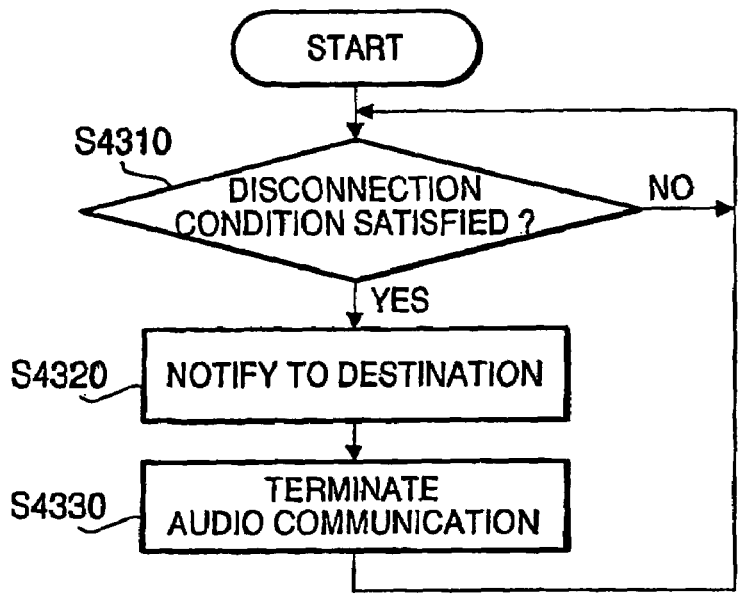
FIG. 19 shows a flowchart illustrating an interruption notifying procedure according to the second embodiment.

Further, in S4310 of FIG. 19, when the satisfaction of the interrupting condition is detected during the wireless communication using the cordless handset 4, the audio signal of the "interruption notifying message" can be output to external device (i.e., the telephone network 100 or the audio cable 300). Therefore, the audio notification is transmitted to the terminal with which the telephone communication is currently made.

The configuration of the second embodiment can be modified in various ways without departing from the scope of the invention.

For example, in the second embodiment, the MFD 2 is configured to have the structure and devices so as to constitute a telephone machine. However, the MFD 2 can be any other device, and is only required to have a function of the telephone.

In the second embodiment, the route switching procedure and the interruption notifying procedure are executed by a computer system of the MFD 2 including the control unit 11 thereof. This may be modified such that one or both of the procedures is executed in another computer system which is connected to the MFD 2 with a wired/wireless signal transmission path.

In the second embodiment, whether the audio signal is input is detected in S4140 using the level detector 18a. Alternatively, S4140 may be modified such that, whether a predetermined period has passed since the ringing tone is started to be output in S4120 is determined, and control proceeds to S2130 when the predetermined period has not passed, while control proceeds to S2150 when the predetermined period has passed.

In the above-described second embodiment, the transmission path is reset in S4190 after the operation to terminate the communication is performed in S4180. This portion may be modified such that a step for determining whether the audio signal is input through the audio I/F 18 is inserted before S4180, and control proceeds to S4180 when the audio signal is input, while control proceeds to S4190 (skipping S4180) when the audio signal is not input.

In the above-described second embodiment, the transmission path of the audio signal is set when the operational conditions as follows are satisfied: (1) the audio signal is input through the audio I/F 18; and (2) the operation to terminate the communication is performed In S4180.

However, the invention need not to such a configuration, and the operational conditions that trigger the resetting of the transmission path may include the followings: (a) depressing a predetermined operation button for a long period of time (i.e., for at least a certain period of time); or (2) operating a plurality of operation buttons in a predetermined order. Alternatively, a dedicated operation switch for switching the transmission path may be provided, for example, to the user I/F 13.

In the second embodiment, in S4120, the ringing tone is output to notify that the audio signal is input. Alternatively or optionally, in order to notify that the audio signal is being input, a message indicating the input of the audio signal may be displayed on the display panel 13a of the user I/F 13 of the MDS 2 and/or on the display panel 33b of the cordless handset 4.

In the second embodiment, in S4210, by outputting the "continuous input message" from the audio input/output unit 15 and the voice in/out unit of the cordless handset 4, it is notified that the audio signal is being input. Alternatively or optionally, the "continuous input message" may be displayed on one or both of the display panel 13b of the user I/F 13 and the display panel 33b of the cordless handset 4.

Further, according to the second embodiment, in S4310 of FIG. 19, it is determined that the interruption condition is satisfied when (1) the remaining capacity of the battery 37 notified by the notification signal is less than the minimum necessary capacity or (2) the intensity of the received signal level is lower than the predetermined minimum level. This may be modified such that only one of the two conditions (1) is used. Alternatively or optionally, conditions other than the above two conditions may be used as the interruption determining condition.

Furthermore, in the second embodiment, in S4310, one of the conditions refers to whether the intensity of the received signal is lower than the predetermined minimum level. However, the invention need not be limited to such a configuration. This may be modified such that the condition is satisfied when the intensity of the received signal is zero.

Figure 20:
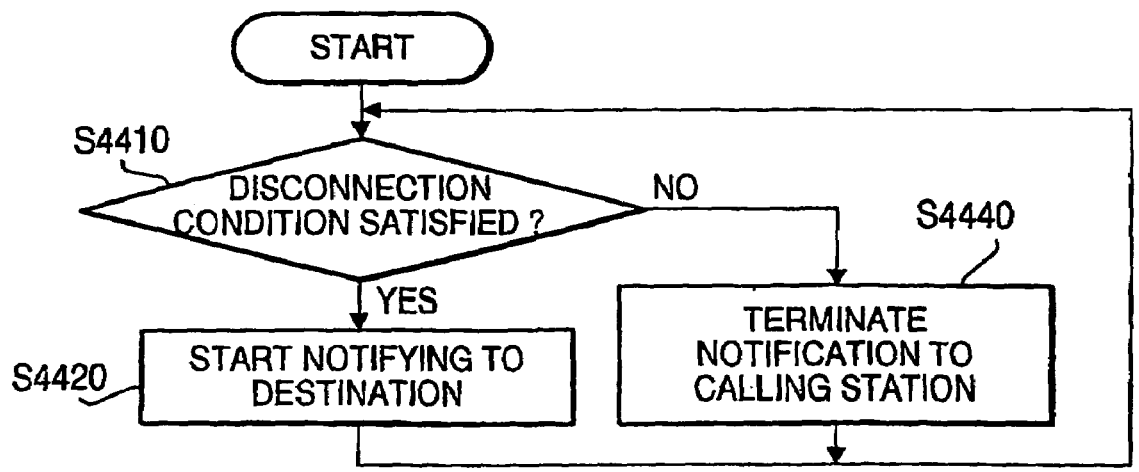
FIG. 20 shows a flowchart illustrating the interruption notifying procedure according to a modification of the second embodiment of the invention.

Further, according to the second embodiment, the audio signal is terminated in S4330 of FIG. 19. This may be modified as shown in FIG. 20. In FIG. 20, S4330 of FIG. 19 is eliminated, the transmission of the cordless handset disconnection guiding voice message may be repeatedly output in S4420, and step S4440 may be added when the disconnection condition is satisfied (S2410: YES). In S4440, the transmission of the cordless handset disconnection guiding voice message is terminated.

It should be noted that, in S4440, no operation is executed if S4420 (i.e., the transmission of the cordless handset disconnection guiding voice message) has not been previously executed. With this modification, the user of the cordless handset 4 may continue the telephone communication by charging or exchanging the battery 37 of the cordless handset 4, by moving to a location where the radio field intensity has a sufficient quantity, or by using another device (e.g., the handset 14 or the audio input/output unit 15).

In the above-described embodiment, the notification is made in S4420, and thereafter, the voice/sound communication is terminated in S4430. However, the invention is not limited to such a configuration. For example, step S4430 is omitted and S4420 is repeated until the operation for terminating the voice/sound communication at the calling station. With this modification, the user of the cordless handset 4 may continue the telephone communication by moving to a location where the radio field intensity has a sufficient quantity or by using another device (e.g., the handset 14 or the audio input/output unit 15).

The present disclosure relates to the subject matter contained in Japanese Patent Applications No. 2002-228706, filed on Aug. 6, 2002 and No. 2002-234844, filed on Aug. 12, 2002, which are expressly incorporated herein by reference in their entireties.

What is claimed is:

1. A telephone device having a telephone line terminal to connect with the telephone network and a voice input/output unit for a voice communication, an audio signal being transmitted/received, through said telephone line terminal and the telephone network, to/from another telephone terminal, said telephone device comprising:

a first audio signal input/output terminal connected with an Internet terminal device, the Internet terminal device being connected with another Internet terminal device through the Internet, the Internet terminal device transmitting/receiving audio signals for a voice communication with the another Internet terminal device through the Internet in accordance with an Internet telephone executing command signal that is externally input to the Internet terminal device;

a first control signal input/output terminal that is connected with the Internet terminal device and transmitting/receiving control signals including the Internet telephone executing command signal;

a first command input system that is operated by a user to input an Internet telephone starting command to said telephone terminal;

an audio signal route switching system that switches a source or a destination of the audio signal, that is received or transmitted through the voice input/output device, from the telephone line terminal to the first audio signal input/output terminal when the Internet telephone starting command is input through the first command input system, wherein the audio signal route switching system switches the source or the destination of the audio signal, that is received or transmitted through the voice input/output unit, from the audio signal input/output terminal to the telephone line terminal automatically, when the voice communication between the Internet terminal devices is terminated; and an Internet terminal device controlling system that controls said first control signal input/output terminal to output the Internet telephone executing command to the Internet terminal device so that the audio signal is transmitted/received between the Internet terminal device and another Internet terminal device.

2. The telephone device according to claim 1, wherein said first command input system is configured to input terminal device information indicative of the another Internet terminal device with which the Internet terminal device communicates, and wherein said Internet terminal device controlling system controls said first control signal input/output terminal to transmit the terminal device information to the Internet terminal device so that the Internet terminal device makes a call to the another Internet terminal device when the terminal information of the another Internet terminal device is input through said operable member.

3. The telephone device according to claim 1, further including a second command input system that is operated by the user to input a terminating command for terminating the Internet telephone, said Internet terminal device controlling system controls said first control signal input/output terminal to output an Internet telephone terminating command to the Internet terminal device so as to terminate the transmission/reception of the audio signals between the Internet terminal device and the another Internet terminal device when the terminating command is input through said second command input system.

4. The telephone device according to claim 1, further including a notifying system which notifies that a ringing signal that is a call to the telephone device is transmitted from the Internet terminal device.

5. The telephone device according to claim 1, further comprising:

a voice data storing device that stores voice data for guidance messages to be transmitted to a terminal device that makes a call to said telephone device;

an audio guidance setting system that is operated by the user to set whether to reproduce an audio signal from the voice data stored in said voice data storing device and transmits the reproduced audio signal to the another terminal device that makes a call to said telephone device;

an audio guidance transmitting system that controls said first audio signal input/output terminal to transmits the voice data stored in said voice data storing device to the Internet terminal device so that the Internet terminal device transmits the audio signal to the another Internet terminal with which the telephone device communicates when it is set, with the audio guidance setting system, to transmit the audio signal to the another terminal device that makes a call to said telephone device.

6. The telephone device according to claim 1, further including a cordless terminal device which functions as said voice input/output device.

7. The telephone device according to claim 6, further includes:
   an interruption condition detection system that detects an interrupting condition that a wireless communication using said cordless terminal device is to be interrupted; and
   an interruption notifying system that transmits an audio signal for notifying that the wireless communication is interrupted to the another Internet terminal device that is switched to as the destination by said audio signal route switching system when said interruption condition detection system detects that the interrupting condition is satisfied.

8. The telephone device according to claim 7, wherein said cordless terminal device is configured to transmits a remaining capacity of a battery that supplies power to said cordless terminal device to said interruption condition detection system, and wherein said interruption condition detection system detects that the interruption condition is satisfied when the remaining capacity of the battery is equal to or less than a predetermined threshold value.

9. The telephone device according to claim 7, wherein said interruption condition detection system is capable of detecting a radio field intensity of an electromagnetic wave said cordless terminal device receives for the wireless communication, said interruption condition detection system detecting that the interruption condition is satisfied when the radio field intensity of the electromagnetic wave is equal to or less than a predetermined threshold value.

10. A telephone device having a telephone line terminal to connect with the telephone network and a voice input/output unit for a voice communication, an audio signal being transmitted/received, through said telephone line terminal and the telephone network, to/from another telephone terminal, said telephone device comprising:
   a first audio signal input/output terminal connected with an Internet terminal device, the Internet terminal device being connected with another Internet terminal device through the Internet, the Internet terminal device transmitting/receiving audio signals for a voice communication with the another Internet terminal device through the Internet in accordance with an Internet telephone executing command signal that is externally input to the Internet terminal device;
   a first control signal input/output terminal that is connected with the Internet terminal device and transmitting/receiving control signals including the Internet telephone executing command signal;
   a first command input system that is operated by a user to input an Internet telephone starting command to said telephone terminal;
   an audio signal route switching system that switches a source or a destination of the audio signal, that is received or transmitted through the voice input/output device, from the telephone line terminal to the first audio signal input/output terminal when the Internet telephone starting command is input through the first command input system;
   an Internet terminal device controlling system that controls said first control signal input/output terminal to output the Internet telephone executing command to the Internet terminal device so that the audio signal is transmitted/received between the Internet terminal device and another Internet terminal device;
   a cordless telephone device which functions as said voice input/output device;
   an interruption condition detection system that detects an interrupting condition that a wireless communication using said cordless terminal device is to be interrupted; and
   an interruption notifying system that transmits an audio signal for notifying that the wireless communication is interrupted to the another Internet terminal device that is switched to as the destination by said audio signal route switching system when said interruption condition detection system detects that the interrupting condition is satisfied,
   wherein said cordless terminal device is configured to transmit a remaining capacity of a battery that supplies power to said cordless terminal device to said interruption condition detection system, and wherein said interruption condition detection system detects that the interruption condition is satisfied when the remaining capacity of the battery is equal to or less than a predetermined threshold value.

11. A telephone device having a telephone line terminal to connect with the telephone network and a voice input/output unit for a voice communication, an audio signal being transmitted/received, through said telephone line terminal and the telephone network, to/from another telephone terminal, said telephone device comprising:
   a first audio signal input/output terminal connected with an Internet terminal device, the Internet terminal device being connected with another Internet terminal device through the Internet, the Internet terminal device transmitting/receiving audio signals for a voice communication with the another Internet terminal device through the Internet in accordance with an Internet telephone executing command signal that is externally input to the Internet terminal device;
   a first control signal input/output terminal that is connected with the Internet terminal device and transmitting/receiving control signals including the Internet telephone executing command signal;
   a first command input system that is operated by a user to input an Internet telephone starting command to said telephone terminal;
   an audio signal route switching system that switches a source or a destination of the audio signal, that is received or transmitted through the voice input/output device, from the telephone line terminal to the first audio signal input/output terminal when the Internet telephone starting command is input through the first command input system;
   an Internet terminal device controlling system that controls said first control signal input/output terminal to output the Internet telephone executing command to the Internet terminal device so that the audio signal is transmitted/received between the Internet terminal device and another Internet terminal device;
   a cordless telephone device which functions as said voice input/output device;

an interruption condition detection system that detects an interrupting condition that a wireless communication using said cordless terminal device is to be interrupted; and an interruption notifying system that transmits an audio signal for notifying that the wireless communication is interrupted to the another Internet terminal device that is switched to as the destination by said audio signal route switching system when said interruption condition detection system detects that the interrupting condition is satisfied, wherein said interruption condition detection system is capable of detecting a radio field intensity of an electromagnetic wave said cordless terminal device receives for the wireless communication, said interruption condition detection system detecting that the interruption condition is satisfied when the radio field intensity of the electromagnetic wave is equal to or less than a predetermined threshold value.

* * * * *